(12) United States Patent
Takashima

(10) Patent No.: US 12,056,851 B2
(45) Date of Patent: Aug. 6, 2024

(54) INFORMATION PROCESSING DEVICE, INFORMATION PROCESSING METHOD, AND PROGRAM

(71) Applicant: Sony Group Corporation, Tokyo (JP)

(72) Inventor: Masatoshi Takashima, Tokyo (JP)

(73) Assignee: Sony Group Corporation, Tokyo (JP)

( * ) Notice: Subject to any disclaimer, the term of this patent is extended or adjusted under 35 U.S.C. 154(b) by 762 days.

(21) Appl. No.: 17/265,636

(22) PCT Filed: Aug. 5, 2019

(86) PCT No.: PCT/JP2019/030752
§ 371 (c)(1),
(2) Date: Feb. 3, 2021

(87) PCT Pub. No.: WO2020/031970
PCT Pub. Date: Feb. 13, 2020

(65) Prior Publication Data
US 2021/0304368 A1    Sep. 30, 2021

(30) Foreign Application Priority Data
Aug. 10, 2018   (JP) ................................ 2018-152031

(51) Int. Cl.
*G06T 5/70* (2024.01)
*G06T 7/13* (2017.01)
*G06V 20/10* (2022.01)

(52) U.S. Cl.
CPC .................. *G06T 5/70* (2024.01); *G06T 7/13* (2017.01); *G06V 20/188* (2022.01); *G06T 2207/10032* (2013.01); *G06T 2207/30188* (2013.01)

(58) Field of Classification Search
CPC . G06T 5/002; G06T 7/13; G06T 2207/10032; G06T 2207/30188; G06T 5/70; G06V 20/188
See application file for complete search history.

(56) References Cited

U.S. PATENT DOCUMENTS 5,404,178 A * 4/1995 Kondo .................. H04N 19/80
375/E7.193
6,996,184 B2 * 2/2006 Hamamatsu .............. G06T 5/70
348/E5.077

(Continued)

FOREIGN PATENT DOCUMENTS

CN    104614321 A  *  5/2015
CN    106290197 A  *  1/2017
(Continued)

OTHER PUBLICATIONS

Bannari et al. ("A review of vegetation indices," Remote sensing reviews, vol. 13, 1995) (Year: 1995).*

(Continued)

*Primary Examiner* — Manav Seth
(74) *Attorney, Agent, or Firm* — Michael Best & Friedrich LLP

(57) ABSTRACT

Disclosed is an information processing device, comprising: acquisition circuitry configured to acquire image data including a frame; and index calculation circuitry configured to: determine an average value of the frame, and predict a signal-to-noise ratio of the image data based on the average value of the frame.

18 Claims, 16 Drawing Sheets

(56) References Cited

U.S. PATENT DOCUMENTS

| | | | | |
|---|---|---|---|---|
| 7,263,240 | B2* | 8/2007 | Edgar | G06T 5/70 |
| | | | | 382/254 |
| 7,327,895 | B2* | 2/2008 | Kaltschmidt | G06T 5/70 |
| | | | | 382/260 |
| 8,233,062 | B2* | 7/2012 | Mitsuya | G06T 5/50 |
| | | | | 348/241 |
| 8,346,011 | B2* | 1/2013 | Kelm | G06T 5/50 |
| | | | | 382/270 |
| 8,363,975 | B2* | 1/2013 | Suzuki | G06T 7/44 |
| | | | | 382/254 |
| 8,477,219 | B2* | 7/2013 | Takatori | G06T 5/20 |
| | | | | 348/241 |
| 11,542,035 | B2* | 1/2023 | Takahashi | G02F 1/13 |
| 2005/0025377 | A1* | 2/2005 | Avinash | G06T 5/002 |
| | | | | 382/260 |
| 2007/0174095 | A1* | 7/2007 | McComb | G06Q 40/08 |
| | | | | 705/4 |
| 2007/0211307 | A1 | 9/2007 | Uvarov | |
| 2009/0074318 | A1* | 3/2009 | Yoo | G06T 5/002 |
| | | | | 382/260 |
| 2015/0254800 | A1* | 9/2015 | Johnson | G06V 20/188 |
| | | | | 382/141 |
| 2018/0177136 | A1* | 6/2018 | Reimann | G06N 5/04 |
| 2018/0247127 | A1* | 8/2018 | Bovik | G06V 20/41 |
| 2019/0219499 | A1* | 7/2019 | Gold | G01N 21/359 |
| 2019/0236358 | A1* | 8/2019 | Tokumaru | G06T 3/4015 |
| 2020/0005038 | A1* | 1/2020 | Logie | G06T 7/11 |
| 2021/0304368 | A1* | 9/2021 | Takashima | G06V 20/188 |

FOREIGN PATENT DOCUMENTS

| | | | | |
|---|---|---|---|---|
| CN | 106841116 A | * | 6/2017 | |
| JP | H10262160 A | | 9/1998 | |
| JP | 5162890 B2 | | 6/2008 | |
| JP | 2008205737 A | | 9/2008 | |
| WO | WO-2015195988 A1 | * | 12/2015 | G01J 3/4406 |
| WO | WO-2016203689 A1 | * | 12/2016 | |
| WO | WO-2017010258 A1 | | 1/2017 | |

OTHER PUBLICATIONS

Bo-Cai Gao, An Operational Method for Estimating Signal to Noise Ratios from Data Acquired with Imaging Spectrometers, Remote Sens. Environ., In 1993, vol. 43, pp. 23-33.

International Search Report dated Nov. 27, 2019 for corresponding International Application No. PCT/JP2019/030752 (3 pages).

Liu Ke et al, "Estimating the crop leaf area index using hyperspectral remote sensing", Journal of Integrative Agriculture, vol. 15, No. 2, Feb. 28, 2016 (Feb. 28, 2016), p. 475-491, XP029458116 DOI: 10.1016/S2095-3119(15)61073-5 external link ISSN:2095-3119.

Phillips R D et al, "An Adaptive Noise-Filtering Algorithm for AVIRIS Data With Implications for Classification Accuracy", IEEE Transactions on Geoscience and Remote Sensing, IEEE Service Center, Piscataway, NJ, US, vol. 47, No. 9, Sep. 1, 2009 (Sep. 1, 2009), p. 3168-3179, XP011269914 DOI: 10.1109/TGRS.2009.2020156 external link ISSN:0196-2892.

Lei Ji et al, "Geostatistical estimation of signal-to-noise ratios for spectral vegetation indices", ISPRS Journal of Photogrammetry and Remote Sensing., vol. 96, Oct. 1, 2014 (Oct. 1, 2014), p. 20-27, XP055639745 DOI: 10.1016/j.isprsjprs.2014.06.013 external link ISSN:0924-2716.

P. M. Atkinson et al, "Exploring the Geostatistical Method for Estimating the Signal-to-Noise Ratio of Images", Jul. 31, 2007 (Jul. 31, 2007), Retrieved from the Internet: URL:https://www.asprs.org/wp-content/uploads/pers/2007journal/july/2007_jul_841-850.pdf XP055639743 [retrieved on Nov. 6, 2019].

\* cited by examiner

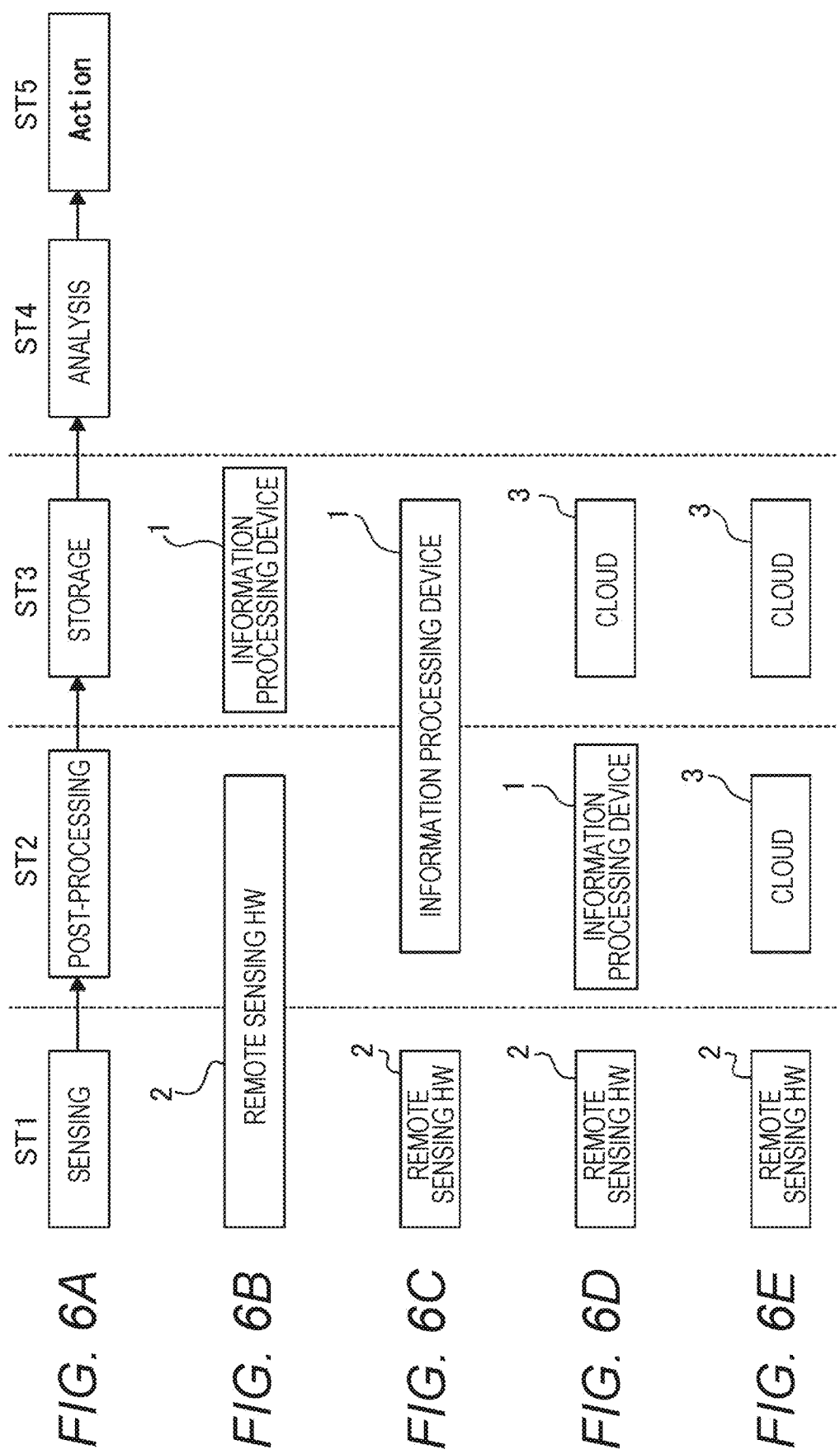

FIG. 8C $\quad P(\lambda) = \frac{CameraOut(\lambda)}{G(\lambda) \times L(\lambda)}$

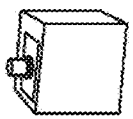 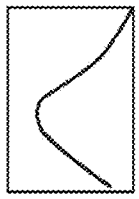
FIG. 13A
 
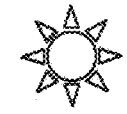  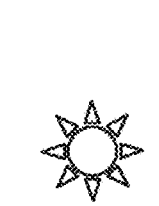 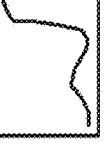
FIG. 13B
FIG. 13C $P(\lambda) = \dfrac{CameraOut(\lambda)}{C(\lambda) \times L(\lambda)}$

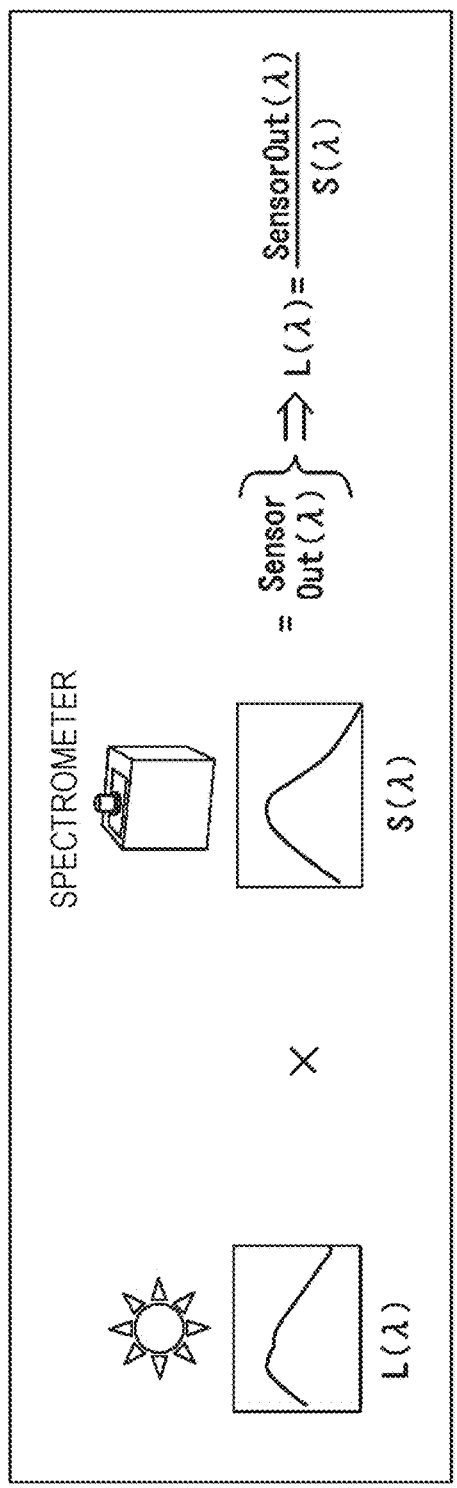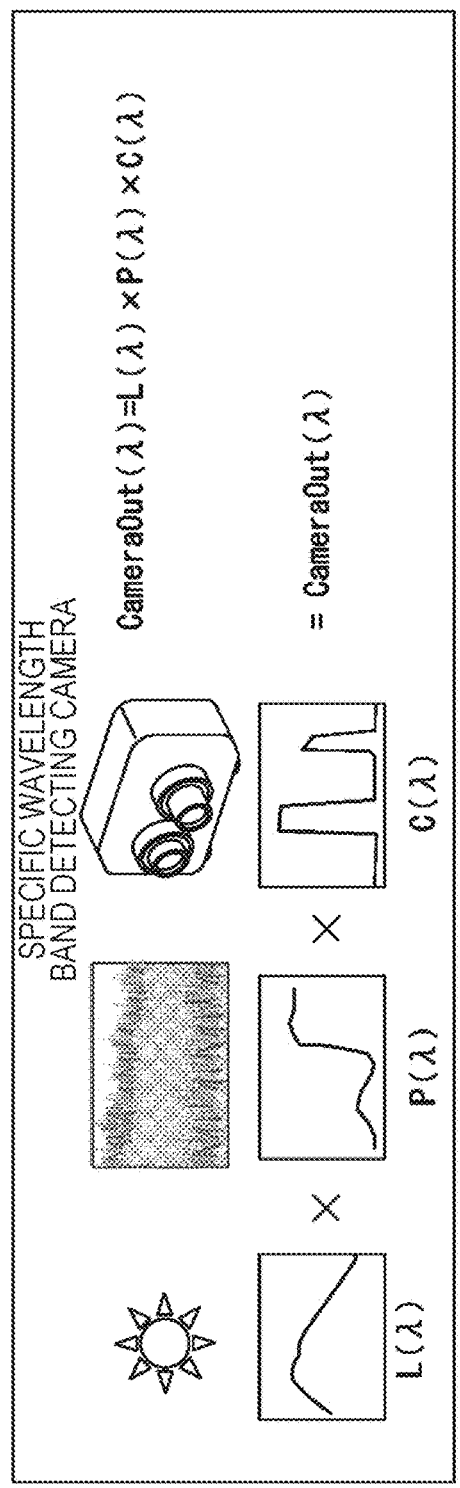
FIG. 14A
FIG. 14B
FIG. 14C $P(\lambda) = \dfrac{CameraOut(\lambda)}{C(\lambda) \times L(\lambda)}$

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2018-152031 filed on Aug. 10, 2018, the entire contents of which are incorporated herein by reference.

TECHNICAL FIELD

The present technology relates to an information processing device, an information processing method, and a program, and more particularly to a technique applicable to a device and a system that calculate an evaluation index based on a captured image.

BACKGROUND ART

For example, there is an attempt of installing an imaging device (camera) in a small flight vehicle and remotely sensing a vegetation state of a plant by imaging the vegetation state of the plant while moving over a farm field.

A technique of imaging a farm field and performing remote sensing is disclosed in PTL 1.

CITATION LIST

Patent Literature

[PTL 1]
JP 5162890B2

SUMMARY

Technical Problem

For example, an image obtained by imaging the farm field as described above is mapped, and the vegetation state is observed on the basis of a mapping image. It is possible to measure a vegetation index from the captured image of the vegetation of the farm field, and it is possible to generate an image by which the vegetation of the entire farm field can be observed by imaging the wide farm field for each part and synthesizing a plurality of captured images. For example, a normalized difference spectral index (NDSI) or the like is obtained as the vegetation index, and a mapping image is synthesized from a plurality of captured images so that an NDSI image can be checked in a wide area.

However, a sensing result differs greatly depending on various factors such as a sun position according to a time zone, a photographing angle, and the weather. Even in one flight, it suddenly changes from sunny to cloudy, and the sensing result is affected. However, with regard to such external factors, it is possible to increase targets that can be compared by eliminating or classifying cases with different environments, for example.

However, a signal-noise ratio (SNR) of general image sensors is only about 42 dB, and it is difficult to perform accurate sensing at present. In particular, if the above problems are solved, and highly accurate sensing results are obtained, the accuracy of an image sensor becomes a major issue.

Further, the SNR of the imaging result largely depends on a signal level of a captured image. Although it is desirable to reduce a change thereof by automatic exposure control, it is a reality that a change in a signal level has to be allowed to some extent due to the difficulty of reliably responding to sudden change in the weather.

At this point, in a case where the weather changes suddenly from sunny to cloudy during the flight, since the SNR in the flight is greatly different, it is difficult to obtain results of a certain level or more of sensing accuracy.

In this regard, in the present technology, it is desirable to make it possible to obtain a certain level or more of accuracy which is sufficient as an evaluation index for a measurement result even when there are circumstances such as an environment at the time of imaging, an environmental change, and the accuracy of an image sensor.

Solution to Problem

An information processing device according to an embodiment of the present technology includes an evaluation calculating unit that performs a process of predicting an SNR of image data, an SNR adjustment process of adjusting the SNR of the image data on the basis of the predicted SNR, and a process of calculating an evaluation index on the basis of the image data which has undergone the SNR adjustment process.

For example, in a case where an evaluation index is obtained from image data obtained by imaging an observation target, the SNR may not be sufficient depending on an SNR of image data, and therefore, an SNR is predicted for each image in advance, and SNR adjustment is performed accordingly.

In the information processing device according to an embodiment of the present technology, the evaluation calculating unit may predict an SNR of image data of an evaluation index and calculates the evaluation index in a state in which the SNR adjustment process of each element in which the evaluation index is calculated and each pixel of the image data is performed.

For example, an SNR of image data of an evaluation index such as an NDSI image is predicted, and SNR adjustment of an element in which the evaluation index is calculated (for example, an image of a specific wavelength) or each pixel thereof is performed.

In the information processing device according to an embodiment of the present technology, the SNR adjustment process may be a process of adjusting the SNR of the image data in accordance with a deficient SNR obtained from the predicted SNR and from a target SNR.

Since insufficiency for the target SNR is estimated by predicting the SNR, the SNR adjustment corresponding to the deficient SNR is performed.

In the information processing device according to an embodiment of the present technology, the SNR adjustment process may be a process of averaging neighboring pixels corresponding to a number obtained using the deficient SNR.

The averaging of the neighboring pixels is performed as an SNR adjustment technique. The number of neighboring pixels to be averaged for the SNR adjustment corresponding to the deficient SNR is set to a number obtained using the deficient SNR.

In the information processing device according to an embodiment of the present technology, the SNR adjustment process may be a process of performing spatial noise reduction on neighboring pixels corresponding to a number obtained using the deficient SNR.

The spatial noise reduction is performed as an SNR adjustment technique. The number of target pixels is set to a number obtained using the deficient SNR.

In the information processing device according to an embodiment of the present technology, a process explicitly indicating an area in which the SNR adjustment process is not valid may be performed when the evaluation index is presented.

In other words, an area in which sufficient accuracy is unable to be ensured even with SNR adjustment is presented to the users clearly.

In the information processing device according to an embodiment of the present technology, the evaluation index may be a vegetation evaluation index.

In other words, in a system that performs remote sensing of vegetation, SNR adjustment is performed on a captured image or a vegetation evaluation image generated from a captured image.

In the information processing device according to an embodiment of the present technology, the evaluation calculating unit may calculate a spectral characteristic of a reflectance ratio of a plant by reflecting a spectral characteristic of a light source and calculates the vegetation index from the calculated spectral characteristic of the reflectance ratio of the plant. Here, the light source is, for example, a light source that changes due to influence of the weather or the like such as the sunlight. The spectral characteristic of the reflectance ratio of the plant is calculated in a state in which the light source is calibrated.

In the information processing device according to an embodiment of the present technology, the evaluation calculating unit may perform a process of obtaining a predictive value of the SNR of the image data using values of an average signal level, a light shot noise, a dark-time noise, and a quantization noise of a frame for each frame of the image data.

The average signal level of the frame is an average value of pixels in the frame. The light shot noise, the dark-time noise, and the quantization noise are calculated from the specifications of the image sensor of the imaging device. The predictive value of the SNR of the image data is obtained by a calculation using them.

An information processing method according to an embodiment of the present technology is an information processing method executed by an information processing device, including a process of predicting an SNR of image data, an SNR adjustment process of adjusting the SNR of the image data on the basis of the predicted SNR, and a process of calculating an evaluation index on the basis of the image data which has undergone the SNR adjustment process.

In other words, the SNR adjustment is performed so that the SNR degradation does not occur due to the weather and other influences. A program according to an embodiment of the present technology is a program causing an information processing device to execute the processes of the procedures described above. Accordingly, the information processing devices and the information processing methods according to an embodiment of the present technology can be realized using a computer device and widely provided.

An information processing device according to an embodiment of the present technology comprises acquisition circuitry configured to acquire image data including a frame; and index calculation circuitry configured to: determine an average value of the frame, and predict a signal-to-noise ratio of the image data based on the average value of the frame.

An information processing method according to an embodiment of the present technology comprises acquiring image data including a frame; determining an average value of the frame; and predicting a signal-to-noise ratio of the image data based on the average value of the frame.

A non-transitory computer-readable medium according to an embodiment of the present technology stores instructions that, when executed by a processor of a computer, cause the computer to perform operations comprising acquiring image data including a frame; determining an average value of the frame; and predicting a signal-to-noise ratio of the image data based on the average value of the frame.

Advantageous Effects of Invention

According to the present technology, there is an effect that an evaluation index with high accuracy can be stably obtained.

Further, the effects described herein are not necessarily limited, and any of effects described in the present disclosure may be included.

BRIEF DESCRIPTION OF DRAWINGS

FIGS. 6A to 6E are explanatory diagrams of a correspondence example of a system operation and a device according to an embodiment.

FIGS. 8A to 8C are explanatory diagrams of calculation of a spectrum of a plant according to a first embodiment.

FIGS. 13A to 13C are explanatory diagrams of calculation of a spectrum of a plant according to a second embodiment.

FIGS. 14A to 14C are explanatory diagrams of calculation of a spectrum of a plant according to a third embodiment.

DESCRIPTION OF EMBODIMENTS

Hereinafter, embodiments will be described in the following order.
<1. Overview of remote sensing system>
<2. Device configuration>
<3. First Embodiment>
<4. Second Embodiment>
<5. Third Embodiment>
<6. Fourth Embodiment>
<7. Application example to mobile body>
<8. Conclusion and modified example>

1. Overview of Remote Sensing System

In an embodiment, a case where sensing of the vegetation state of the farm field is performed will be described as an example.

Figure 1:
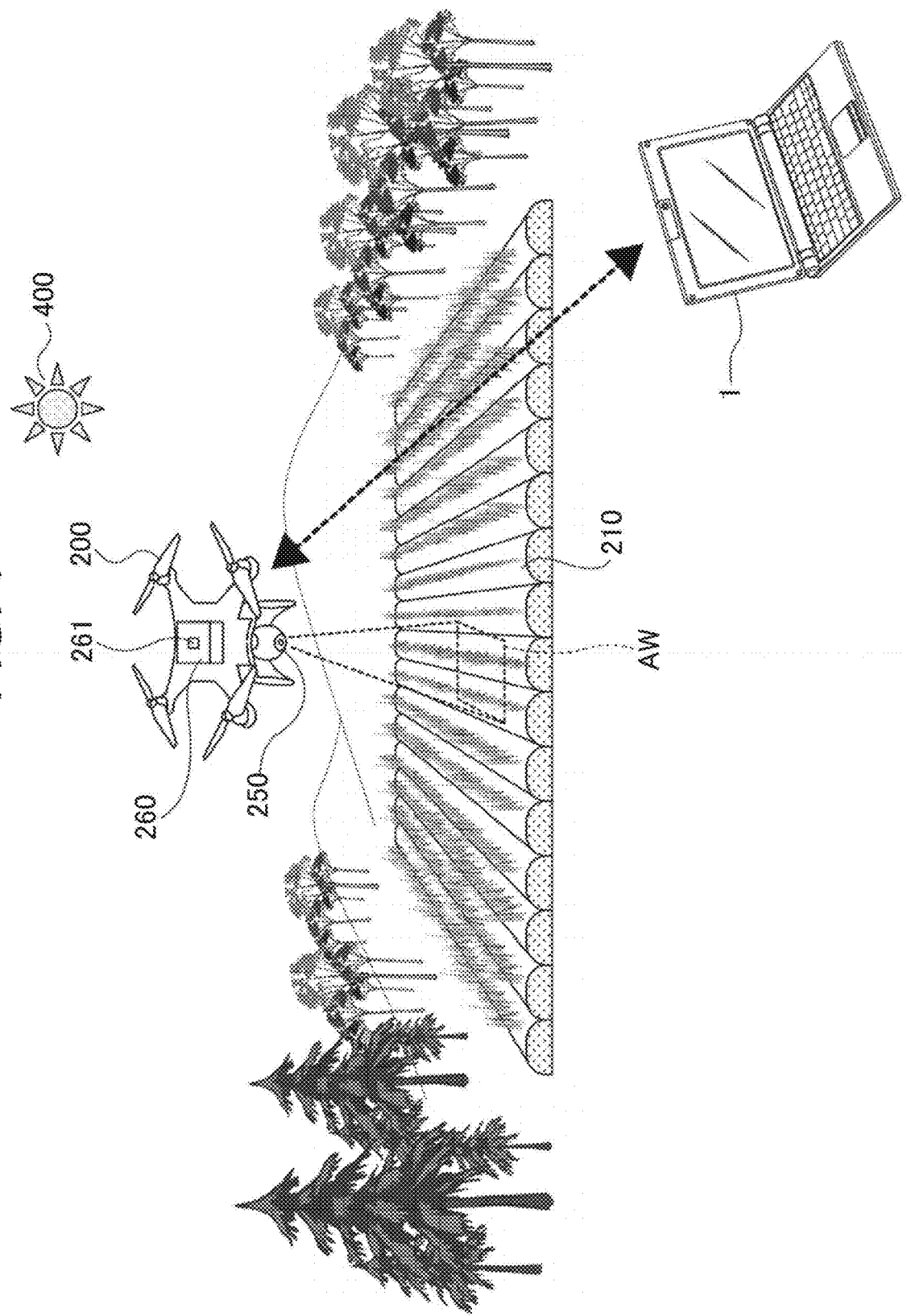
FIG. 1 is an explanatory diagram of an imaging state of a farm field according to an embodiment of the present technology.

For example, as illustrated in FIG. 1, remote sensing related to vegetation of a farm field 210 is performed using an imaging device 250 installed in a flight vehicle 200. Then, a mapping image indicating vegetation data (for example, data of a vegetation index) is generated using a plurality of pieces of image data (simply referred to as "image") obtained by the imaging.

FIG. 1 illustrates a state of the farm field 210. The small flight vehicle 200 can move over the farm field 210 in accordance with, for example, wireless control of an operator, wireless automatic control, or the like.

In the flight vehicle 200, the imaging device 250 is set to image, for example, an area therebelow. The imaging device 250 can obtain an image of a range AW of an imaging field of view at each time point, for example, by periodically performing still image imaging in a case where the flight vehicle 200 moves over the farm field 210 in a predetermined path.

Figure 2A:
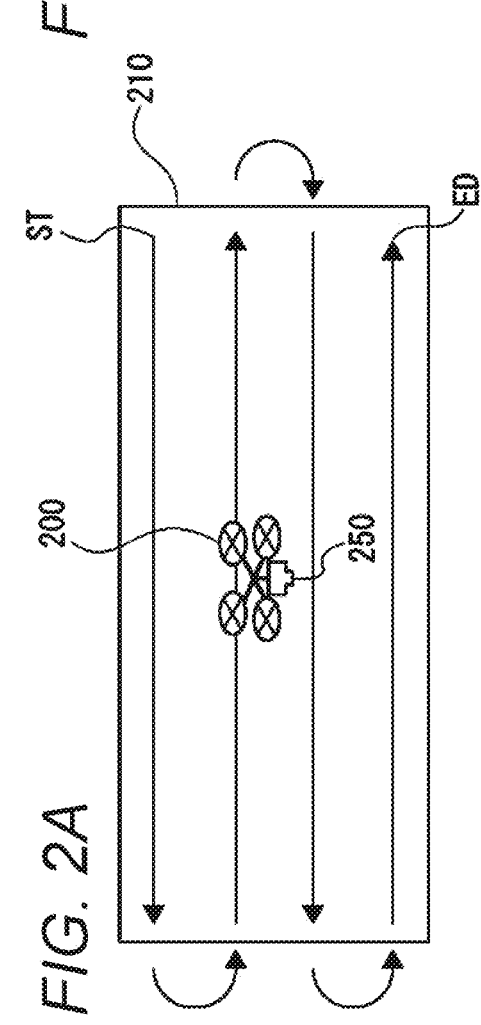
FIGS. 2A to 2D are explanatory diagrams of a remote sensing operation and image mapping of an embodiment.
Figure 2B:
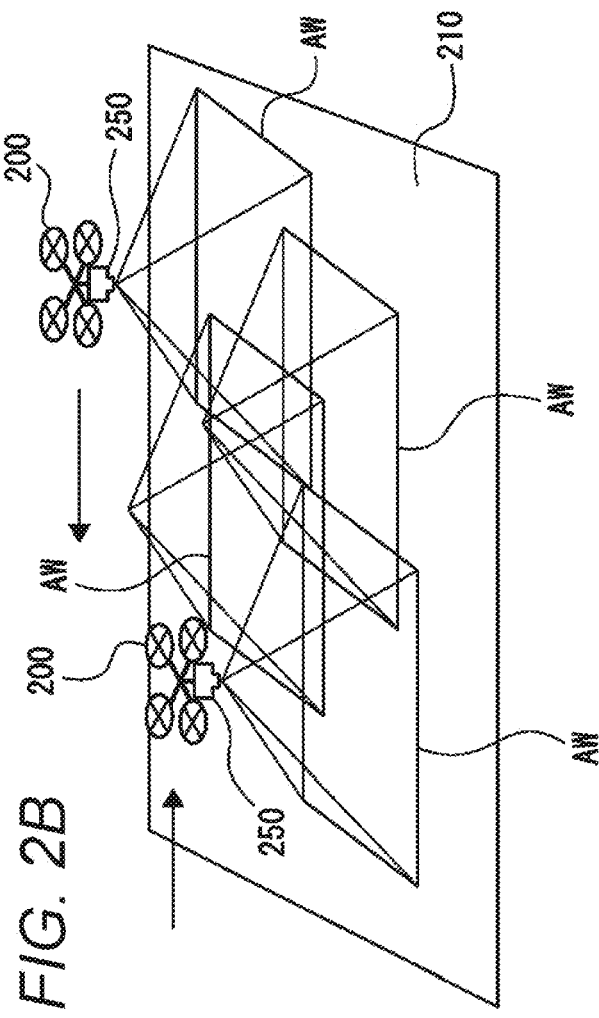

For example, the flight vehicle 200 flies above the farm field 210 from a start position ST illustrated in FIG. 2A to an end position ED while turning back. During the flight, the imaging device 250 images the range AW illustrated in FIG. 2B at each time point.

A type of imaging device 250 used as the imaging device 250 can be variously considered.

For example, an image file (a captured image at a certain time point) obtained by imaging of the imaging device 250 may include a spectroscopic measurement image.

For example, the imaging device 250 may be a multi-spectral camera or a hyper spectral camera, and a captured image may include a measurement image having information of a plurality of wavelength areas.

Further, a camera for capturing a visible light image of R (a red wavelength area: 620 nm to 750 nm), G (a green wavelength area: 495 nm to 570 nm), and B (a blue wavelength area: 450 nm to 495 nm) may be used as the imaging device 250.

Further, a camera capable of obtaining a captured image of a red wavelength area (RED: 620 nm to 750 nm) and a near infrared area (near infra red (NIR): 750 nm to 2500 nm) and calculating a normalized difference vegetation index (NDVI) from an obtained image may be used as the imaging device 250. The NDVI is an index illustrating a distribution state or a degree of activity of vegetation.

Further, the value of the NDVI which is one of vegetation indices can be calculated using RED image data and NIR image data as follows:

$$NDVI = (1 - RED/NIR)/(1 + RED/NIR)$$

Further, various types of additional data are associated with the image obtained by imaging with the imaging device 250.

Examples of the additional data include information detected by various types of sensors (referred to collectively as "sensor data" for the sake of description), device information of the imaging device 250, and captured image information related to a captured image.

Specifically, the sensor data includes data such as imaging date/time information, position information (latitude/longitude information) which is Global Positioning System (GPS) data, illuminance information, altitude information, and imaging posture information (a slope in an imaging direction in a state in which it is installed in the flight vehicle 200).

For this reason, for example, a sensor box 260 including an illuminance sensor 261 is installed in the flight vehicle 200, or for example, a sensor for detecting the imaging date/time information, the position information, the altitude information, the imaging posture information, or the like is installed in the imaging device 250.

The device information of the imaging device 250 includes individual identification information of the imaging device, model information, camera type information, a serial number, manufacturer information, and the like.

The captured image information includes information such as an image size, a codec scheme, a detection wavelength, and an imaging parameter.

As described above, the additional data including the image data obtained by the imaging device 250 installed in the flight vehicle 200 or the sensor data obtained by various types of sensors is transmitted to an information processing device (computer device) 1. The information processing device 1 performs various types of processes using the image data and the sensor data. For example, the information processing device 1 performs a process of generating the mapping image which is the NDSI image or the NDVI image or a process of displaying the mapping image.

Figure 2C:
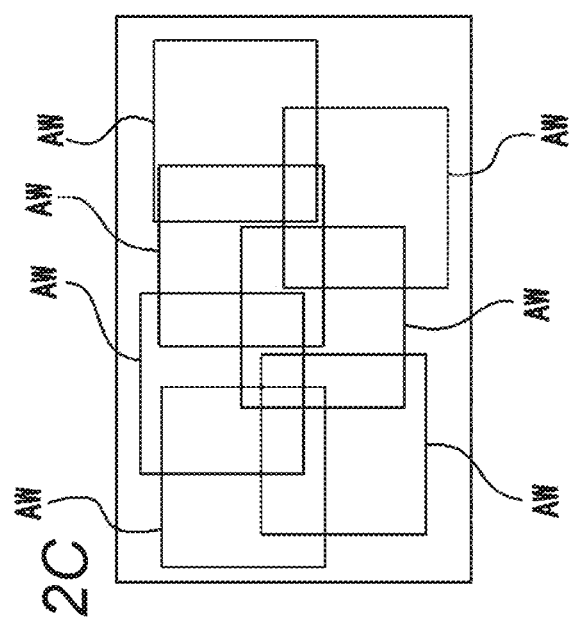
Figure 2D:
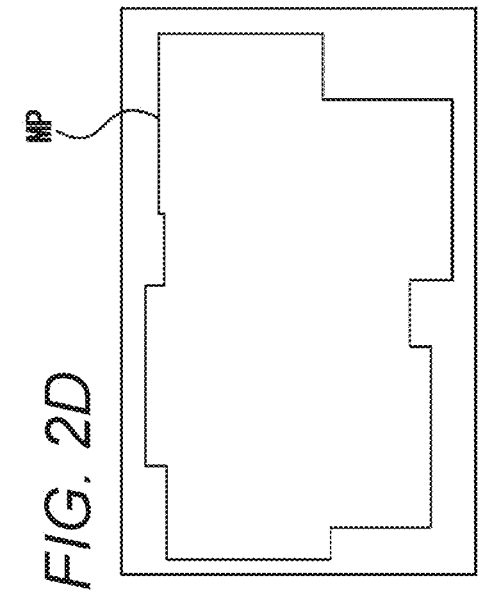

For example, FIG. 2C illustrates the ranges AW of subjects of a plurality of images captured by the imaging device 250, but, for example, a mapping image MP of FIG. 2D is generated by arranging the ranges AW in accordance with position information for imaging them and stitching the ranges AW. Accordingly, an image indicating a vegetation evaluation index for the entire farm field 210 is generated.

The information processing device 1 is realized, for example, as a personal computer (PC), a field-programmable gate array (FPGA), or the like.

Further, although the information processing device 1 is a device separate from the imaging device 250 in FIG. 1, an arithmetic device (a microcomputer or the like) serving as the information processing device 1 may be installed in a unit including the imaging device 250.

2. Device Configuration

Figure 3:
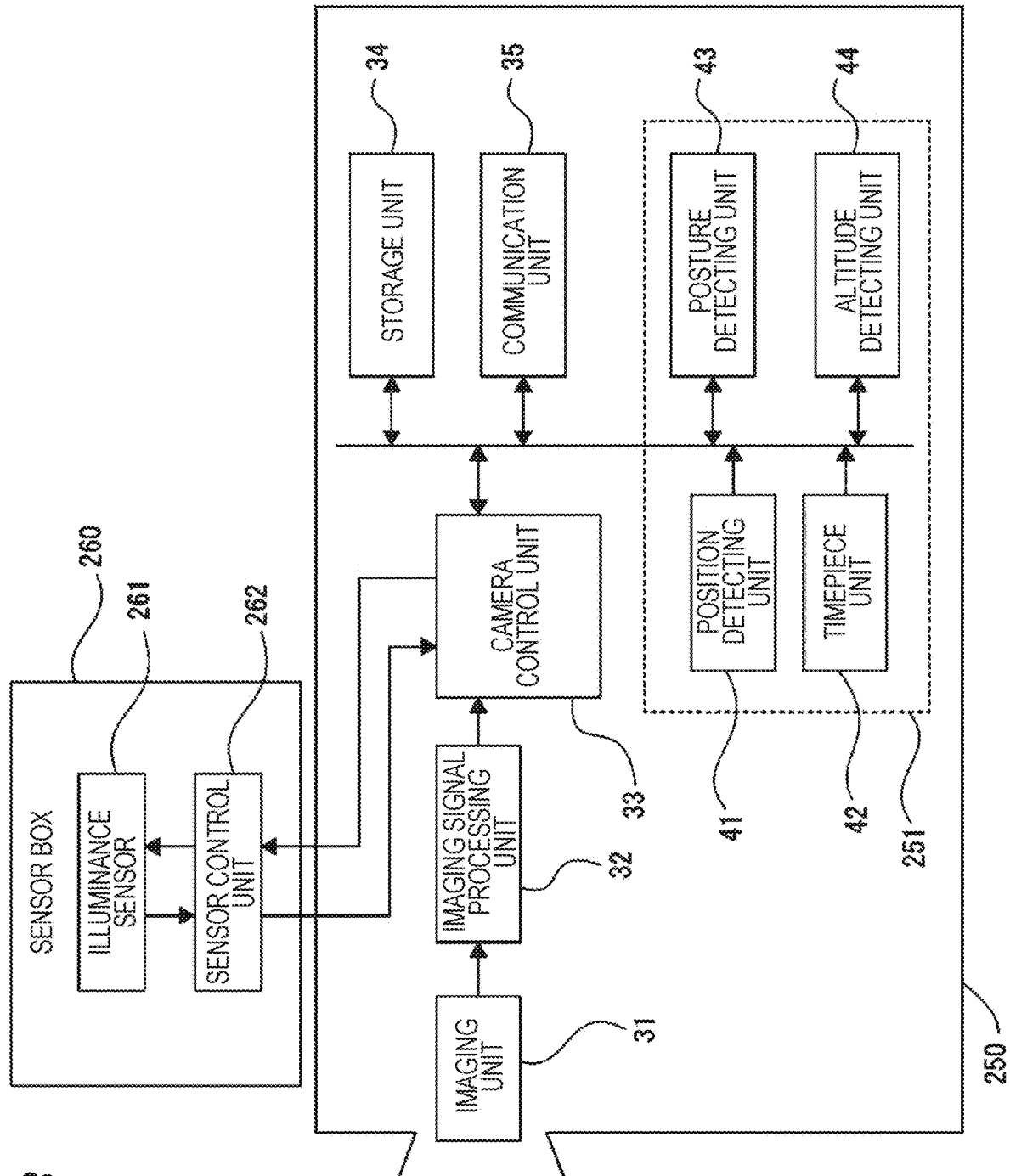
FIG. 3 is a block diagram of an imaging device and a sensor box of an embodiment.

FIG. 3 illustrates configuration examples of the imaging device 250 and the sensor box 260 installed in the flight vehicle 200.

In the present embodiment, the imaging device 250 and the sensor box 260 equipped with the illuminance sensor 261 are installed in the flight vehicle 200. For example, in the example of FIG. 1, they are installed so that a light receiving surface of the illuminance sensor 261 serves as an upper surface side of the flight vehicle 200.

The illuminance sensor 261 can detect a level (illuminance) of the sunlight from a sun 400.

A sensor control unit 262 is installed in the sensor box 260 and can perform communication with a camera control unit 33 of the imaging device 250. Accordingly, the camera control unit 33 can acquire illuminance information detected by the illuminance sensor 261.

The imaging device 250 includes an imaging unit 31, an imaging signal processing unit 32, a camera control unit 33, a storage unit 34, a communication unit 35, and a sensor unit 251.

The imaging unit 31 includes an imaging lens system, an exposure unit, a filter, an image sensor, and the like, and receives subject light and outputs a captured image signal which is an electrical signal.

In other words, in the imaging unit 31, light (reflected light) from a subject such as a measurement object is incident on an image sensor through a lens system and a filter.

The lens system refers to an incident optical system including various lenses such as an incident end lens, a zoom lens, a focus lens, and a condenser lens.

The filter is a filter for extracting a wavelength which is desired to be measured for a measurement object. This generally refers to a color filter configured on an image sensor, a wavelength filter arranged in front of it, and the like.

The exposure unit is a portion that performs exposure control by adjusting the aperture by the optical system such as the lens system or an iris (diaphragm) so that sensing is performed in a state in which signal charges fall within a dynamic range without being saturated in the image sensor.

The image sensor includes a sensing element in which a plurality of pixels are two-dimensionally arranged on a sensor surface with a repeating pattern.

The image sensor detects light which has passed through the filter through the sensing element, and outputs a captured image signal corresponding to the amount of light to the imaging signal processing unit 32.

The imaging signal processing unit 32 converts the captured image signal output from the image sensor of the imaging unit 31 into digital data by performing an A/D conversion process and the like, further performs various types of necessary signal processes, and outputs a processing result to the camera control unit 33 as image data of the measurement target.

For example, as the image data of the measurement target, image data of a plurality of specific wavelengths is output to the camera control unit 33. Of course, image data serving as an RGB color image may be output to the camera control unit 33. Alternatively, for example, in a case where a captured image of a red wavelength area (RED) and a near infrared area (NIR) are obtained, RED image data and NIR image data are generated and output to the camera control unit 33. Alternatively, it may be image data of other wavelength bands.

The camera control unit 33 is constituted by, for example, a microcomputer, and performs overall operation control of the imaging device 250 such as an imaging operation, an image data storage operation, and a communication operation.

The camera control unit 33 performs a process of sequentially storing the image data supplied from the imaging signal processing unit 32 in the storage unit 34.

At this time, various types of sensor data obtained by the sensor unit 251 and the illuminance sensor 261 are added and stored in the storage unit 34 as an image file.

Alternatively, sensor data may be stored as a file associated with image data.

The storage unit 34 is, for example, a flash memory serving as an internal memory of the imaging device 250, a portable memory card, or the like. Of course, other types of storage mediums may be used.

The communication unit 35 performs transmission and reception of data with an external device via wired or wireless communication. For example, wired communication according to a standard such as Universal Serial Bus (USB) may be performed, or communication of a wireless communication standard such as Bluetooth (registered trademark) or WI-FI (registered trademark) may be performed.

In any case, the image data or the like stored in the storage unit 34 can be transferred to an external device such as the information processing device 1 through the communication unit 35.

Further, in a case where the storage unit 34 is a portable memory card or the like, the stored data may be delivered to the information processing device 1 or the like by delivery of a storage medium such as a memory card.

As the sensor unit 251, a position detecting unit 41, a timepiece unit 42, a posture detecting unit 43, and an altitude detecting unit 44 are installed. The position detecting unit 41 is, for example, a so-called GPS receiver, and can acquire information of latitude and longitude serving as the current position. The timepiece unit 42 measures a current time. The posture detecting unit 43 is, for example, a sensor that detects a flight posture of the flight vehicle 200, for example, a slope in a horizontal direction or a downward direction in accordance with a predetermined algorithm, for example, using an inertial measurement unit (IMU) having a 3-axis gyro and a 3-direction accelerometer. This also detects a slope of the imaging device 250 in the imaging direction. The altitude detecting unit 44 detects the altitude by the flight vehicle 200, that is, the altitude serving as an imaging location.

For example, as the sensor unit 251 equipped with these sensors is installed, the camera control unit 33 can form a file by associating the position information obtained by the position detecting unit 41, the date/time information obtained by the timepiece unit 42, slope information obtained by the posture detecting unit 43, and the altitude information obtained by the altitude detecting unit 44 with image data obtained at each time point.

On the information processing device 1 side, it is possible to acquire the detection data of the sensor unit 251 and the illuminance information obtained by the illuminance sensor 261 together with the image data, and checks the position, the time, the posture, the altitude, and the illuminance when each image is captured.

Further, although FIG. 3 illustrates the example in which the sensor unit 251 is installed in the imaging device 250, for example, the position detecting unit 41, the timepiece unit 42, the posture detecting unit 43, and the altitude detecting unit 44 may be installed in the sensor box 260, and the detection information may be able to be transmitted to the imaging device 250. Further, the example of the sensor is an example. In addition to the above example, other sensors such as a temperature sensor, a direction sensor, or a wind speed sensor may be installed in the sensor unit 251, and a detection value thereof may be associated with the image data. Further, all the sensors described above need not necessarily be installed.

Next, a configuration of the information processing device 1 will be described with reference to FIGS. 4 and 5.

Figure 4:
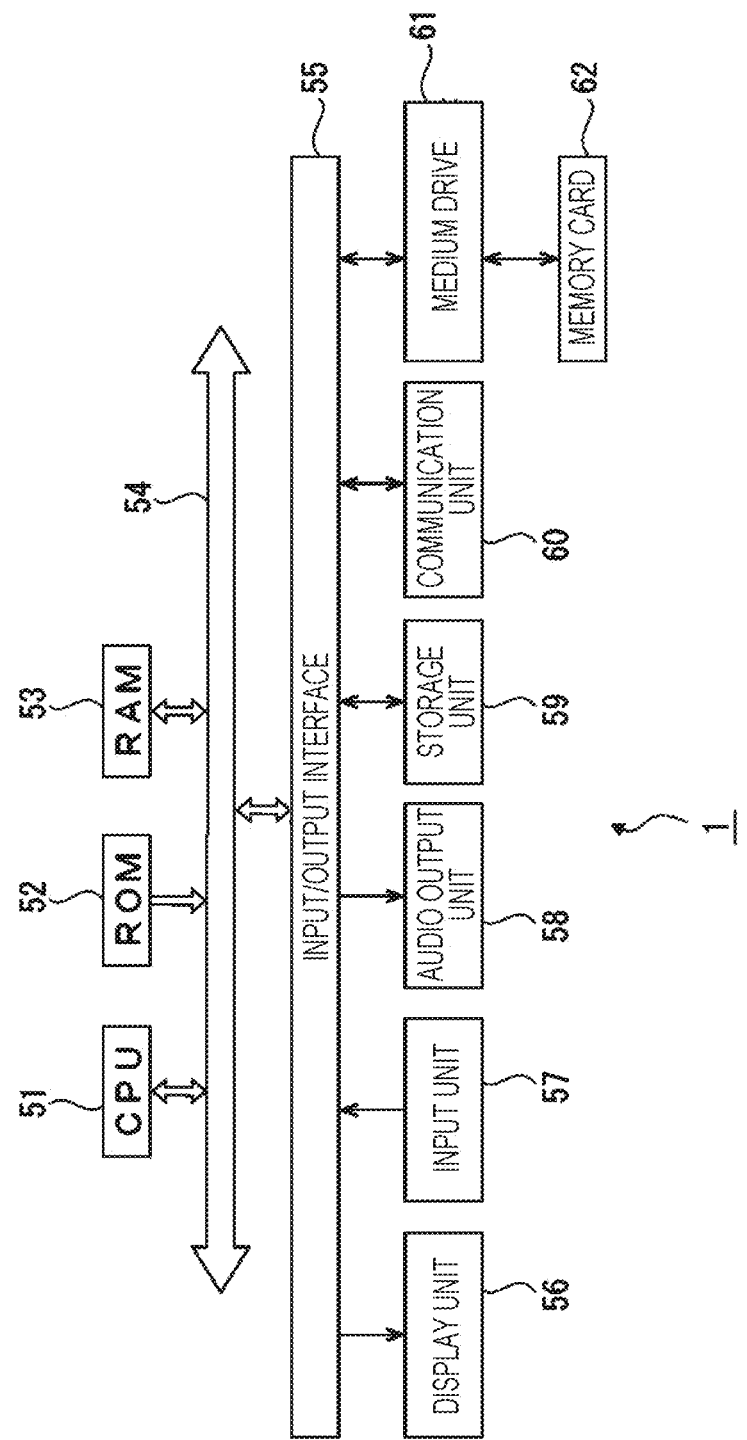
FIG. 4 is a block diagram of an information processing device of an embodiment.

FIG. 4 illustrates an example of a hardware configuration of the information processing device 1 realized by a PC or the like.

As illustrated in FIG. 4, the information processing device 1 includes a central processing unit (CPU) 51, a read only memory (ROM) 52, and a random access memory (RAM) 53.

The CPU 51 executes various types of processes in accordance with a program stored in the ROM 52 or a program which is loaded from a storage unit 59 onto the RAM 53. Further, the RAM 53 stores data necessary when the CPU 51 executes various types of processes or the like.

The CPU 51, the ROM 52, and the RAM 53 are connected to one another via a bus 54. Further, an input/output interface 55 is connected to the bus 54.

A display unit 56, an input unit 57, an audio output unit 58, a storage unit 59, a communication unit 60, a medium drive 61, and the like can be connected to the input/output interface 55.

The display unit 56 is configured as a display device including a liquid crystal display panel or an organic electroluminescence (EL) display panel and a drive circuit for the display panel. The display unit 56 may be a device which is integrated with or separate from the information processing device 1. For example, the display unit 56 displays a captured image, an evaluation index image, or the like.

The input unit 57 means an input device used by the user who uses the information processing device 1. As the input device, for example, a keyboard and a mouse are assumed. Of course, the present disclosure is not limited thereto, and for example, a touch panel integrally formed with the display unit 56, a touch pad, a gesture input device which includes an imaging device and detects a behavior of a user and recognizes an operation as an input, a line of sight input device that detects a line of sight of a user, or the like may be used as the input device.

The audio output unit includes a speaker, a power amplifier unit that drives the speaker, and the like, and performs necessary audio output.

Figure 5C:
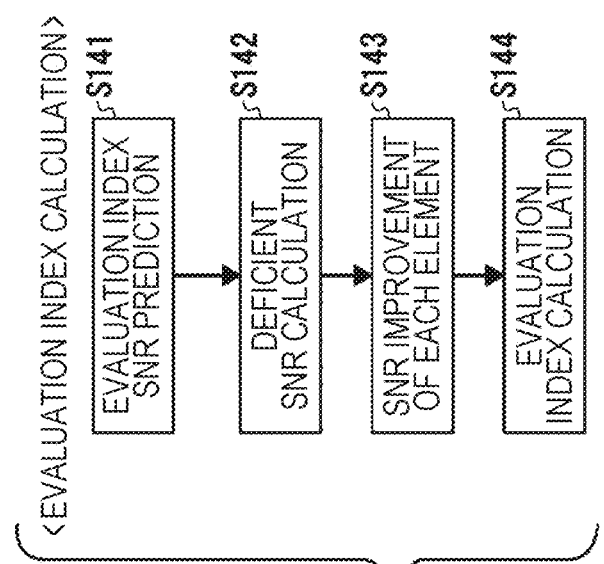
FIGS. 5A to 5C are explanatory diagrams of a functional configuration and a process of an information processing device according to an embodiment.
Figure 5B:
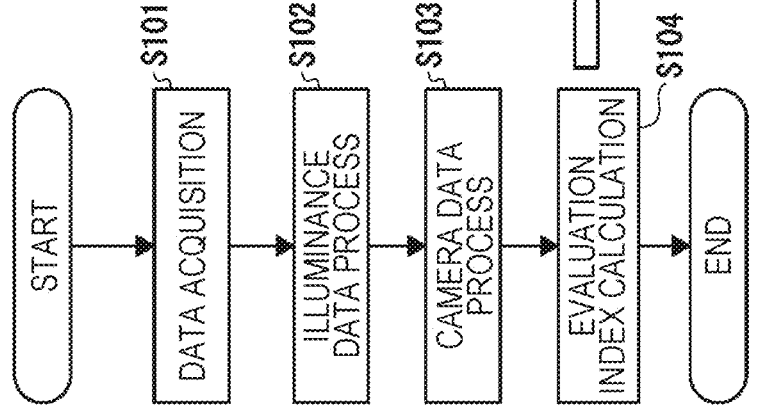
Figure 5A:
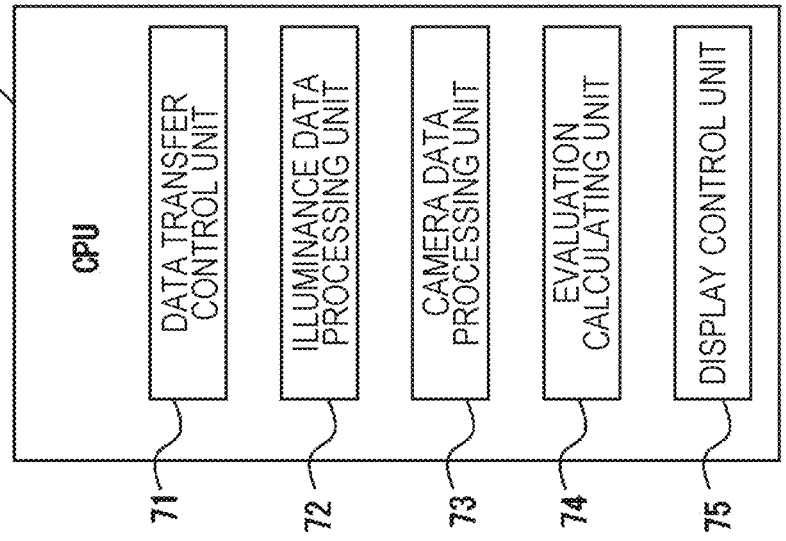

The storage unit 59 includes, for example, a hard disk drive (HDD) and the like, and stores various types of data and programs. For example, a program for realizing the functions to be described later in FIGS. 5A to 5C is stored in the storage unit 59. Further, the image data and various types of additional data obtained by the imaging device 250 are also stored in the storage unit 59, so that processing for various types of image display using the image data can be performed.

The communication unit 60 performs a communication process via a network including the Internet or communication with devices in peripheral parts. The information processing device 1 can download various types of programs via network communication with the communication unit 60 and transfer image data and other data to an external device.

Further, the communication unit 60 may perform wired or wireless communication with the communication unit 35 of the imaging device 250. Accordingly, it is possible to acquire image data or the like captured by the imaging device 250.

Further, for example, the communication unit 60 may perform sequential wireless communication while imaging by the imaging device 250 is being performed and receive and acquire image data or the like or may collectively receive and acquire data at each time point after the imaging ends.

Further, the medium drive 61 is connected to the input/output interface 55 if necessary, and a memory card 62 is installed so that information can be written in or read from the memory card 62.

For example, a computer program read from the memory card 62 is installed in the storage unit 59 if necessary.

Further, for example, in a case where the memory card 62 in which image data and the like are recorded by the imaging device 250 is loaded onto the medium drive 61, the image data and the like can be read and stored in the storage unit 59.

Further, of course, the medium drive 61 may be a recording/reproducing drive for removable storage medium such as a magnetic disk, an optical disk, or a magneto-optical disk.

In such a hardware configuration of the information processing device 1 according to an embodiment, the CPU 51 has functions illustrated in FIG. 5A.

In other words, a data transfer control unit 71, an illuminance data processing unit 72, a camera data processing unit 73, an evaluation calculating unit 74, and a display control unit 75 are installed in the CPU 51 as functions realized by software.

The data transfer control unit 71 is a function of controlling storage and reproduction of data on, for example, the storage unit 59, the medium drive 61, and the like such that necessary data is acquired, or data to be output is stored. Further, the data transfer control unit 71 is also a function of acquiring data from an external device or transmitting data to an external device by exchanging data with the communication unit 60. Here, particularly, it is illustrated as a function for a process using the image data captured by the imaging device 250 and the additional data including various types of detection data.

The illuminance data processing unit 72 performs a process related to the illuminance information detected by the illuminance sensor 261. Particularly, it is a function to perform a spectral characteristic calculation of a light source (sunlight).

The camera data processing unit 73 is a function of performing a reflection spectral characteristic calculation on a subject, that is, a plant in the farm field 210 or the like.

The evaluation calculating unit 74 is a function for calculating various types of vegetation indexes (for example, the NDSI or the like).

The display control unit 75 is a function of performing control such that the captured image, the mapping image, or the like is displayed on the display unit 56.

Although a specific process example will be described later, for example, the information processing device 1 having the configuration of FIG. 4 has the functions of FIG. 5A in the CPU 51 in the form of hardware or software, and thus a process according to an embodiment of the information processing device of the present disclosure is executed. In other words, the processes illustrated in FIGS. 5B and 5C are executed.

As illustrated in FIG. 5A, in step S101, the CPU 51 acquires data. This is a process of acquiring one frame of the captured image data and additional data through the data transfer control unit 71.

In step S102, the CPU 51 performs an illuminance data process. This is a process in which the illuminance data processing unit 72 performs a spectral characteristic calculation of a light source (sunlight) using illuminance information for the frame.

In step S103, the CPU 51 performs a camera data process. This is a process of performing a reflection spectral characteristic calculation of a subject through the camera data processing unit 73.

In step S104, the CPU 51 performs an evaluation index calculation. This is a process of calculating the vegetation index through the evaluation calculating unit 74.

The process of step S104 is illustrated in more detail in FIG. 5C.

First, in step S141, the CPU 51 performs an SNR prediction calculation of an evaluation index. Then, in step S142, the CPU 51 calculates a deficient SNR from a predictive SNR and a target SNR.

Then, in step S143, the CPU 51 performs an SNR improvement process of each element. Each element is an element (for example, an image of a specific wavelength) used for an evaluation index calculation or is each pixel of image data.

Then, in step S144, the CPU 51 performs an evaluation index calculation using each element with an improved SNR. Further, an image indicating the evaluation index calculated by the above procedure is then displayed for the user through the function of the display control unit 75.

In a case where the functions of FIG. 5A performing the processes of FIG. 5A and FIG. 5B are realized by software, a program constituting the software may be downloaded from a network or read from a removable storage medium and installed in the information processing device 1 of FIG. 4. Alternatively, the program may be stored in advance in an HDD serving as the storage unit 59 or the like. Then, when the program is activated in the CPU 51, the functions of the above-described units are performed.

Further, the information processing device 1 of the embodiment is not limited to a configuration in which the number of computer devices (information processing devices) 150 having the hardware configuration illustrated in FIG. 4 is one but may be constituted by a plurality of computer devices in the form of a system.

The plurality of computer devices may constitute a system by a Local Area Network (LAN) or the like or may be remotely arranged by a virtual private network (VPN) using the Internet or the like. The plurality of computer devices may include computer devices that can be used by a cloud computing service.

Further, the information processing device 1 illustrated in FIG. 4 can be realized as a stationary or laptop personal computer or a portable terminal such as a tablet terminal or a smartphone. Further, the function of the information processing device 1 of the present embodiment can be implemented even in electronic devices such as a measuring device, an imaging device, a television device, a monitor device, and a facility management device having the functions of the information processing device 1.

Further, the example of the functional configuration is not limited to that illustrated in FIG. 5A. More various configuration examples may be considered. Further, an example in which the information processing device 1 further includes a function of controlling the flight vehicle 200, a communication function with the imaging device 250, other interface functions, and the like may be considered.

Here, an example of a use form of a system according to the present embodiment will be described.

FIG. 6A schematically illustrates operations performed by a system according to an embodiment.

A sensing ST1 is an imaging operation at the time of flight using the flight vehicle 200.

A post-processing ST2 is a process of calculating an evaluation index using a captured image.

A storage ST3 is a process of storing an evaluation index.

An analysis ST4 is a process of analyzing a sensing result using the stored evaluation index.

An action ST5 illustrates that an analysis result is reflected in an actual action.

For example, in precision agriculture in major agricultural countries such as North America, Europe, and Australia, a result of remote sensing is applied to an analysis tool called a farm management system (FMS), and the result is transmitted as a control signal of a tractor, so that a different action is performed in accordance with a sensing result.

In this case, as the present embodiment, depending in which of a remote sensing system hardware (hereinafter abbreviated as a "remote sensing HW") the sensing ST1, the post-processing ST2, and the storage ST3 are performed, the information processing device 1, and a cloud 3, classifications can be performed as illustrated in FIGS. 6B, 6C, 6D, and 6E.

The remote sensing HW is hardware including the flight vehicle 200, the imaging device 250, and the sensor box 260.

The cloud 3 collectively refers to computer devices or storage devices with which the information processing device 1 can communicate via a network.

FIG. 6B is an example in which the sensing ST1 and the post-processing ST2 are performed in the remote sensing HW, and the storage ST3 is performed in the information processing device 1. In other words, in the case of this example, for example, it is assumed that it is performed until the evaluation index calculation is performed in the imaging device 250 on the flight vehicle 200, and the information processing device 1 performs the storage (or the storage and subsequent actions).

FIG. 6C is an example in which the sensing ST1 is performed in the remote sensing HW, and the post-processing ST2 and the storage ST3 are performed in the information processing device 1. In this example, the information processing device 1 acquires the image data captured in the imaging device 250 on the flight vehicle 200, and performs the evaluation index calculation and the storage.

FIG. 6D is an example in which the sensing ST1 is performed by the remote sensing HW, the post-processing ST2 is performed in the information processing device 1, and the storage ST3 is performed in the cloud 3. In this example, the information processing device 1 acquires the image data captured by the imaging device 250 on the flight vehicle 200, performs the evaluation index calculation, and stores the evaluation index in the cloud 3.

FIG. 6E is an example in which the sensing ST1 is performed by the remote sensing HW, and the post-processing ST2 and the storage ST3 are performed in the cloud 3. In this example, the image data captured by the imaging device 250 on the flight vehicle 200 is transferred to the cloud 3, and the evaluation index calculation and the storage are performed.

In all of these cases, the technology described in the present embodiment can be applied. In other words, the technology of the present disclosure is applicable not only to the information processing device 1 but also to the information processing device 1 in the cloud 3.

The following description of the embodiment will proceed with the case of FIG. 6D.

Figure 7:
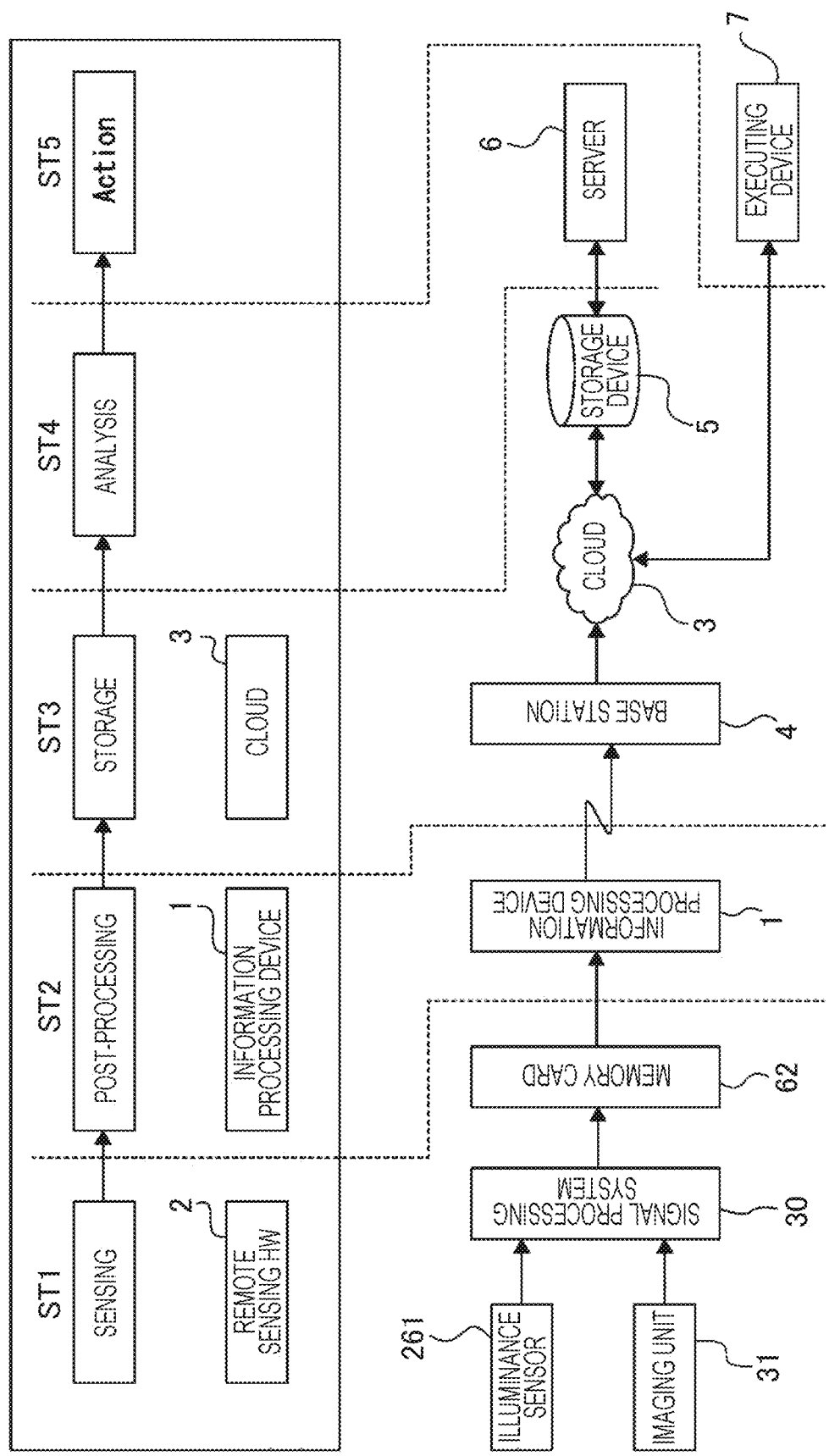
FIG. 7 is an explanatory diagram of a correspondence example between an operation and a device according to embodiment.

An operation overview of the respective units in this case is illustrated in FIG. 7.

For example, sensing 1 is performed in the remote sensing HW. Specifically, the image data captured by the imaging unit 31 and the illuminance information obtained by the illuminance sensor 261 are stored in the memory card 62 through a process of a signal processing system 30. The signal processing system 30 is a generic term of the imaging signal processing unit 32, the camera control unit 33, storage unit 34, and sensor control unit 262.

The memory card 62 is loaded onto the information processing device 1, and the image data and the sensor data are transferred to the information processing device 1. The information processing device 1 performs the evaluation index calculation as the post-processing ST2.

Information of the evaluation index (for example, the NDSI image or the like) is transmitted to the cloud 3 via a base station 4 and stored in a storage device 5 (the storage ST3).

The information of the evaluation index stored in the storage device 5 is used, for example, in an analysis ST4 by analysis software of a server 6.

Further, an instruction to execute an action ST5 corresponding to the analysis result is given to an executing device 7. For example, as control data based on the analysis result is transferred to a tractor or the like which is the executing device 7, variable fertilization, watering, and the like are performed in accordance with a growth condition of a crop.

3. First Embodiment

A specific process example of a first embodiment will be described. In this case, it is assumed that the imaging device 250 is a hyper spectral camera.

Figure 8A:
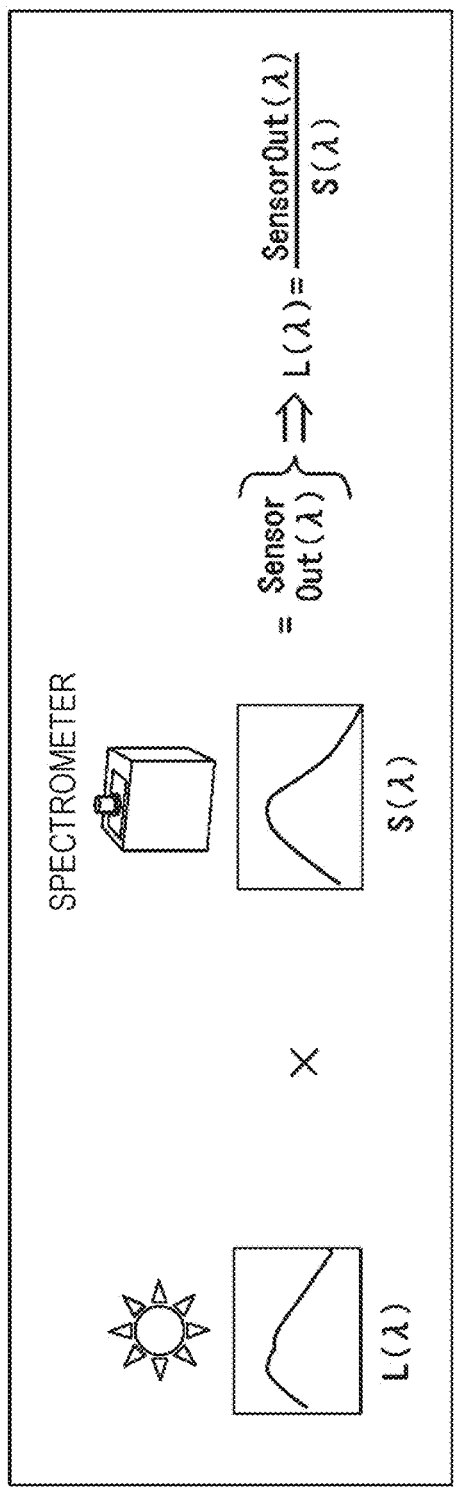
Figure 8B:
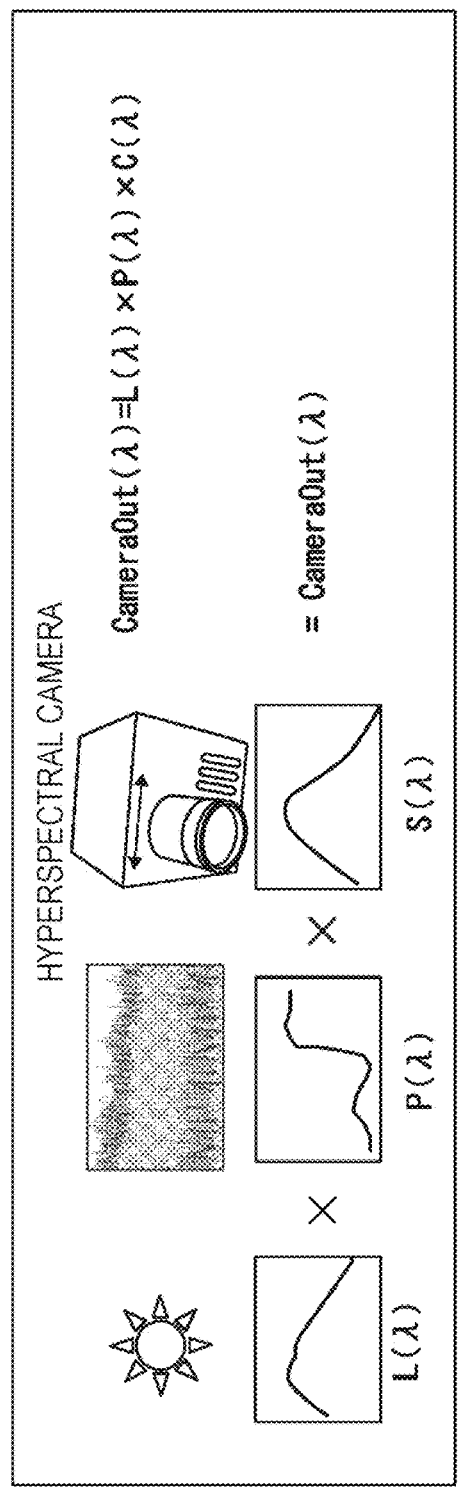

First, FIGS. 8A to 8C illustrate an example of remote sensing of vegetation. The hyper spectral camera can extract images of a plurality of wavelengths at a very detailed level. In this regard, it is necessary to detect a detailed spectral characteristic also for sunlight, and measurement by a spectrometer is often performed (using the spectrometer as the illuminance sensor 261).

FIG. 8B illustrates an output in a case where a plant which is a subject is imaged by the imaging device 250 which is the hyper spectral camera.

$L(\lambda)$ indicates a spectral characteristic of the sunlight, $P(\lambda)$ indicates a spectral characteristic of a reflectance ratio of a plant, and $C(\lambda)$ indicates a spectral characteristic of the imaging device 250 (the hyper spectral camera). An output CameraOut($\lambda$) from the imaging device 250 can be indicated as follow since the sunlight is reflected by the plant and reaches the imaging device 250:

$$CameraOut(\lambda)=L(\lambda) \times P(\lambda) \times C(\lambda)$$

On the other hand, FIG. 8A illustrates an output of a spectrometer installed as the illuminance sensor 261.

$S(\lambda)$ indicates a spectral characteristic of the illuminance sensor 261 (the spectrometer). An output SensorOut($\lambda$) of the illuminance sensor 261 can be indicated as follows since a sunlight spectrum directly falls on the illuminance sensor 261:

$$SensorOut(\lambda)=L(\lambda) \times S(\lambda)$$

A thing which is now desired to obtain is the spectral characteristic $P(\lambda)$ of the reflectance ratio of the subject.

$P(\lambda)$ can be derived by expanding Formula of FIG. 8B as illustrated in FIG. 8C.

Here, as illustrated in FIG. 8A, since $L(\lambda)=SensorOut(\lambda)/S(\lambda)$, this value is substituted into $L(\lambda)$ in Formula of FIG. 8C.

In other words, in FIG. 8B, two values, that is, the spectral characteristic $L(\lambda)$ of the sunlight and the spectral characteristic $P(\lambda)$ of the reflectance ratio of the plant are unknown, whereas in FIG. 8A, the spectral characteristic $L(\lambda)$ of the sunlight can be detected in the environment of FIG. 8A since things excluding the spectral characteristic $L(\lambda)$ are known. By reflecting this result in FIG. 8B, the calibration of the light source can be performed, and the spectral characteristic $P(\lambda)$ of the reflectance ratio of the plant can be correctly calculated. In other words, the spectral characteristic $P(\lambda)$ of the reflectance ratio of the plant can be calculated in a state in which the spectral characteristic $L(\lambda)$ of the sunlight is constant.

Figure 9:
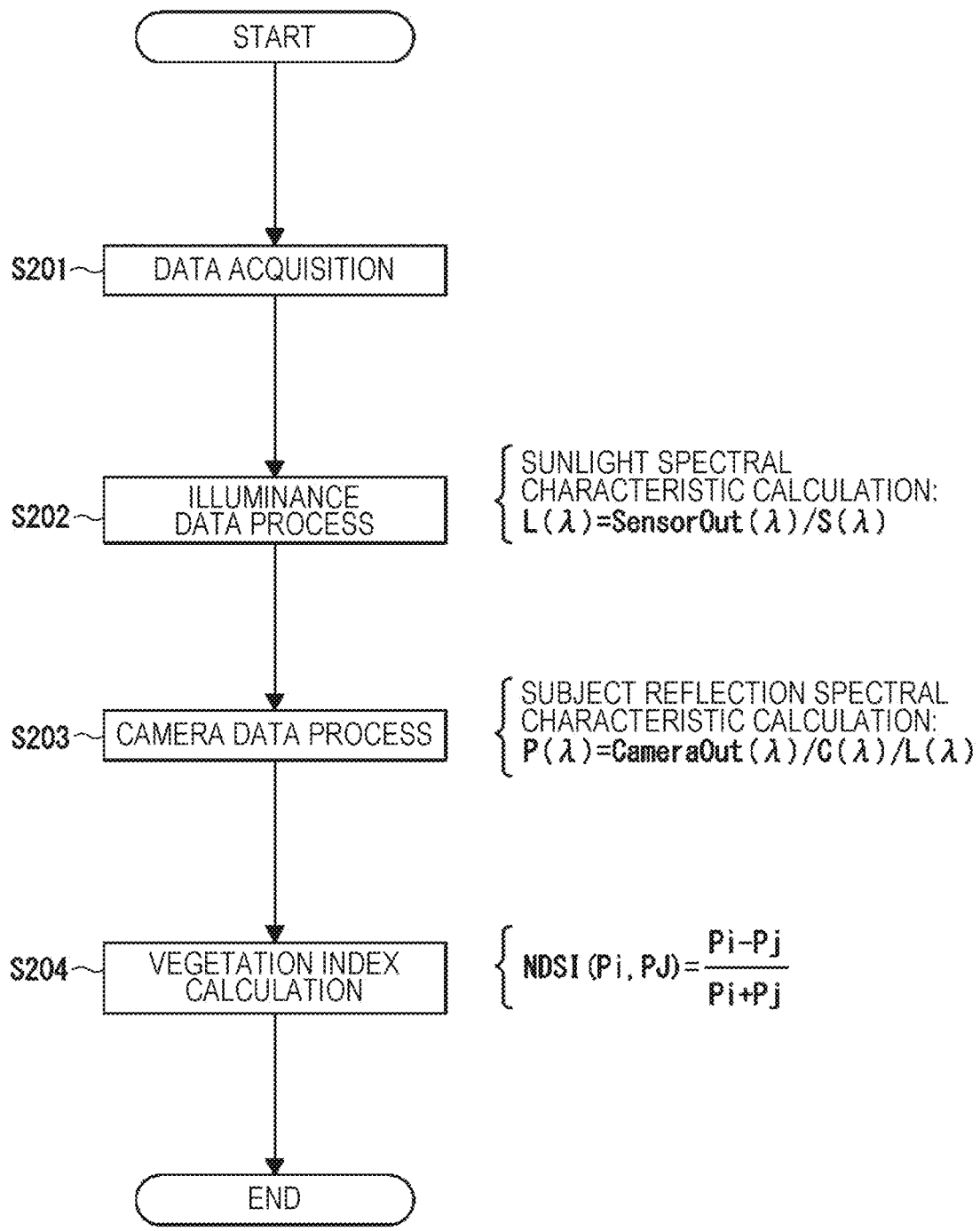
FIG. 9 is a flowchart of a process example of calculating a vegetation index according to an embodiment.

FIG. 9 illustrates a process until the light source calibration and the vegetation index calculation after it is incorporated into the information processing device 1. In step S201, the CPU 51 of the information processing device 1 performs data acquisition. In other words, the captured image data by the imaging device 250 which is the hyper spectral camera and the additional data including the information of the illuminance sensor 261 are acquired.

In step S202, the CPU 51 performs the illuminance data process. In this case, the CPU 51 acquires the detection information (the output SensorOut($\lambda$) of the spectrometer) of the illuminance sensor 261 from the captured additional data, and calculates the spectral characteristic $L(\lambda)$ of the sunlight from the output SensorOut($\lambda$) of the spectrometer and the spectral characteristic $S(\lambda)$ of the spectrometer.

In step S203, the CPU 51 performs the camera data process. In this case, the CPU 51 calculates the spectral characteristic $P(\lambda)$ of the reflectance ratio of the plant using the output CameraOut($\lambda$) of the imaging device 250, the spectral characteristic $C(\lambda)$ of the imaging device 250 (the hyper spectral camera), and the spectral characteristic $L(\lambda)$ of the sunlight.

In step S204, the CPU 51 performs the evaluation index calculation.

Once the spectral characteristic $P(\lambda)$ of the reflectance ratio of the plant can be calculated, various vegetation indexes called the NDSI can be calculated by a combination of two wavelengths. For example, the vegetation index can be calculated as follows using spectral characteristics P(i) and P(j) of reflectance ratios of wavelengths i and j in reflected light of an imaged plant:

$$NDSI(Pi,Pj)=(Pi-Pj)/(Pi+Pj)$$

Figure 10:
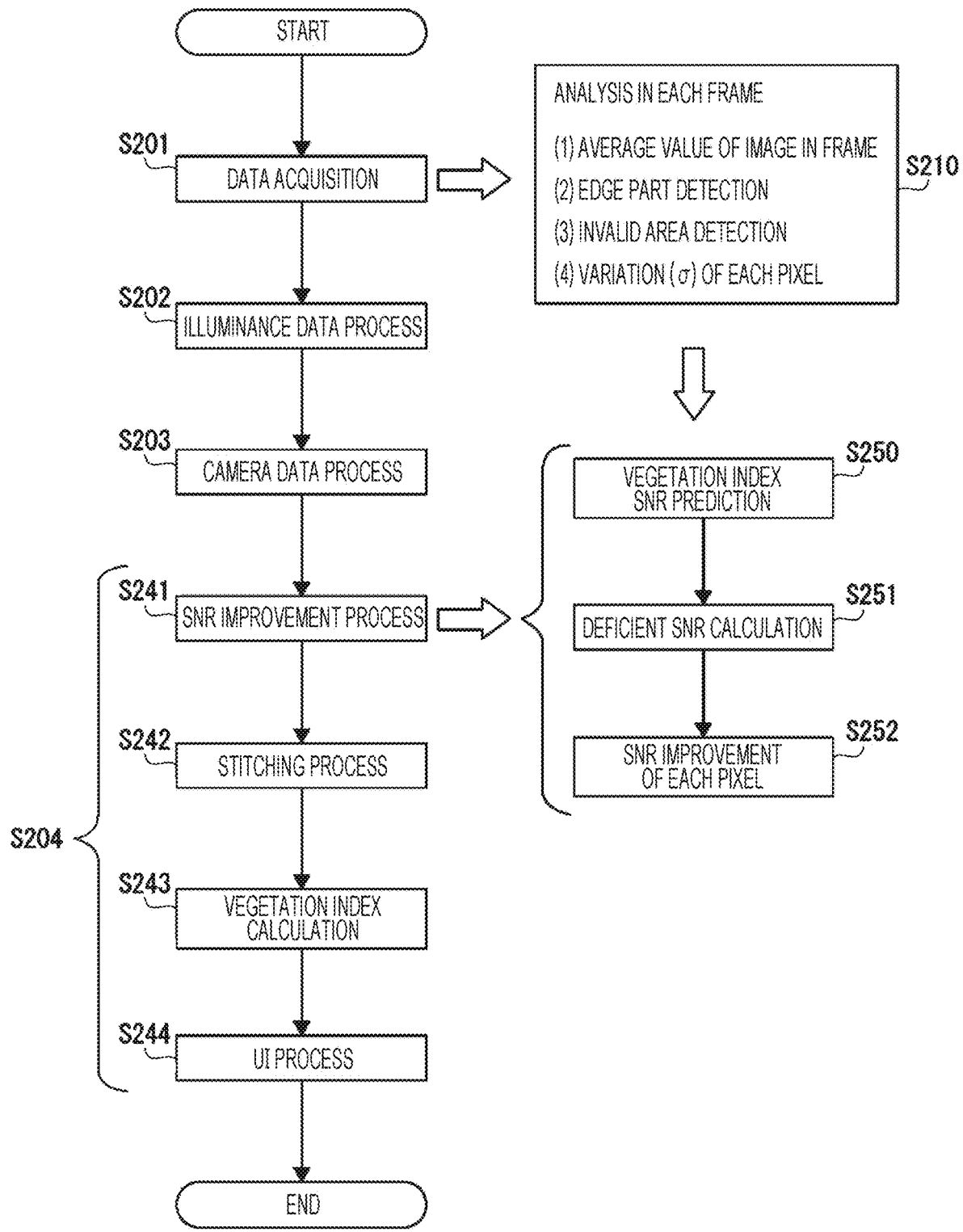
FIG. 10 is a flowchart of a process example of calculating a vegetation index including SNR improvement according to an embodiment.

The basic process has been described so far, but in the present embodiment, a more accurate vegetation index is calculated by performing SNR improvement in the process of step S204. FIG. 10 illustrates the process of FIG. 9 and particularly illustrates the process of steps S201 and S204 in more detail.

In step S201, the CPU 51 performs the data acquisition as described above, but hundreds of pieces of image data are acquired by the information processing device 1 by one flight. The CPU 51 performs the following analysis for each frame in a case where those images are read: In other words, as illustrated as step S210, (1) a calculation of an average value of pixels in a frame,
(2) edge part detection,
(3) invalid area detection, and
(4) a calculation of variation ($\sigma$) of each pixel are performed.

Here, the average value of the pixels in the frame of (1) is an average value of pixels excluding the edge part of (2) and the invalid area of (3), and a variation in this area is calculated as the variation of (4).

Then, after the illuminance data process and the camera data process are performed in steps S202 and S203 as described above, in step S204, the CPU 51 performs the vegetation index calculation including the SNR improvement process.

That is, the vegetation index calculation process of step S204 illustrated in FIG. 9 is executed as an SNR improvement process of step S241, a stitching process of step S242, a vegetation index calculation process of step S243, and a user interface (UI) of step S244 illustrated in FIG. 10.

Further, in the SNR improvement process of step S241, more specifically, processes such as vegetation index SNR prediction of step S250, a deficient SNR calculation of step S251, and SNR improvement of each pixel of step S252 are executed.

As the prediction index SNR prediction of step S250, in step S210, the CPU 51 calculates the SNR of each frame using the analysis result for each frame.

Specifically, an SNR (SNR1) of each frame is calculated by the following Formula 1 from the average value of the pixels in the frame of (1).

[Math. 1]

$$SNR1 = 20\text{Log}\left[\frac{S}{(Ns^2 + Nd^2 + Nq^2)^{0.5}}\right] \quad \text{(Formula 1)}$$

Here, "S" is an average signal level of a frame (=the average value of the pixels in the frame of (1)), "Ns" is a light shot noise, "Nd" is a dark-time noise, and "Nq" is a quantization noise.

Further, the light shot noise Ns, the dark-time noise Nd, and the quantization noise Nq are values calculated from the specifications of the image sensor of the imaging device 250. Therefore, the light shot noise Ns, the dark-time noise Nd, and the quantization noise Nq have unique values by the image sensor and are, for example, known values stored in a memory accessible by the CPU 51.

Further, an SNR (SNR2) of each frame obtained from the analysis result (the variation ($\sigma$) of each pixel of (4)) for each frame is calculated by the following Formula 2.

[Math. 2]

$$SNR2 = 20\text{Log}\left[\frac{S}{\sigma}\right] \quad \text{(Formula 2)}$$

Here, a smaller SNR out of SNR1 and SNR2 is defined as the SNR of the frame by the following Formula 3.

[Math. 3]

$$SNR=\text{MIN}(SNR1, SNR2) \quad \text{(Formula 3)}$$

This means that since a signal component also has a variation, in order to obtain a stable component, it is necessary to regard the variation of the signal component as a part of a noise, and an improvement amount is estimated on the basis of a worse SNR out of SNR1 and SNR2.

Then, the CPU 51 calculates the SNR of the vegetation index (NDSI).

If a vegetation reflectance ratio when wavelength($\lambda$)=I is indicated by Pi, and a vegetation reflectance ratio when wavelength($\lambda$)=j is indicated by Pj, the vegetation index (NDSI) is obtained as in Formula 4.

[Math. 4]

$$NDSI(Pi, Pj) = \frac{\alpha \times Pi - Pj}{\alpha \times Pi + Pj} \quad \text{(Formula 4)}$$

Here, "$\alpha$" is a calibration coefficient decided from the spectral characteristic of the light source and the camera.

Here, the SNR of the vegetation index (NDSI) is calculated as in the following Formula 5 from the SNR decided in Formula 3 if a signal and a noise when wavelength($\lambda$)=i are indicated by Si and Ni, and a signal and a noise when wavelength($\lambda$)=j are indicated by Sj and Nj.

[Math. 5]

$$SNR(NDSI(Pi, Pj)) = 20\text{Log}\left[\frac{\alpha Si + Sj}{\left((\alpha Ni^2 + Nj^2) \times 2\right)^{0.5}}\right] \quad \text{(Formula 5)}$$

The vegetation index SNR prediction process of step S250 has been described above.

Then, in step S251, the CPU 51 calculates the deficient SNR. Now, if it is assumed that a target SNR serving as SNR value which is an improvement target is "SNRt," "SNRup" (that is, a deficient SNR) which is an amount of SNR necessary for improvement is calculated by the following Formula 6.

[Math. 6]

$$SNRup=SNRt-SNR(NDSI(Pi,Pj)) \quad \text{(Formula 6)}$$

There are various methods for improving the SNR value corresponding to the deficient SNR, but as a simple example, peripheral pixels are averaged.

A degree in which pixel averaging is necessary (that is, the number of integrated pixels NUMR) can be calculated by the following Formula 7.

[Math. 7]

$$NUMR=10^{(SNRup/20)} \quad \text{(Formula 7)}$$

At this time, since $\sqrt{NUMR}$ is the number of pixels on one side, a desired SNR can be obtained by averaging with an area of $\sqrt{NUMR} \times \sqrt{NUMR}$.

Further, in a case where it is not a square number, there are a way of ensuring the accuracy of a target value or more and a way of making the accuracy higher even in a case where the target value is not reached. For example, in a case where the number of pixels is "10," it is considered to take an average of 4×4 pixels or an average of 3×3 pixels.

Then, in step S252, the CPU 51 performs the SNR improvement of each pixel.

Figure 11A:
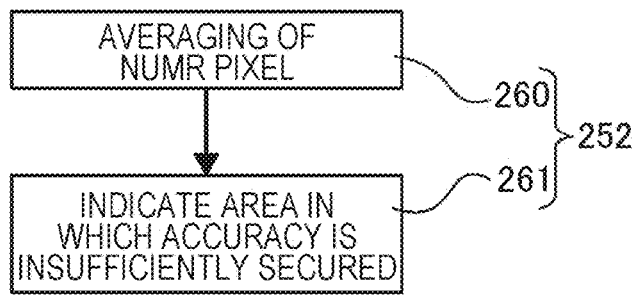
FIGS. 11A to 11C are explanatory diagrams of SNR improvement of each pixel according to an embodiment.
Figure 11B:
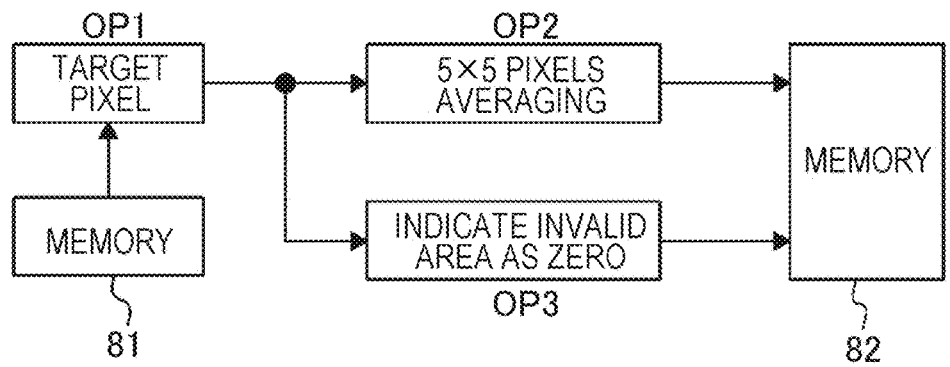
Figure 11C:
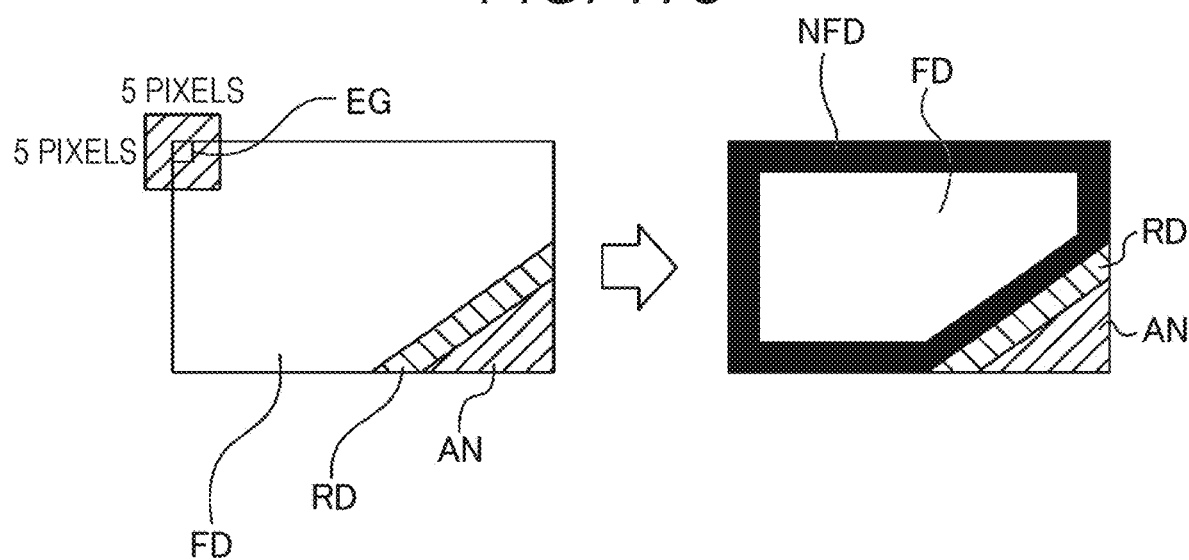

A specific form of the SNR improvement of each pixel is illustrated in FIGS. 11A to 11C. As illustrated in FIG. 11A, the CPU 51 averages the number of integrated pixels NUMR in step S260, and performs a process of indicating an area in which the accuracy is insufficiently secured in step S261.

Here, a case where the necessary SNR improvement amount (SNRup) is about 28 dB, and the number of integrated pixels NUMR is 25, and averaging of 5×5 pixels is necessary is illustrated.

FIG. 11B is a block diagram illustrating the process of steps S260 and S261 of FIG. 11A.

It is assumed that a memory 81 is a storage area that stores image data. The CPU 51 acquires a target pixel from the memory 81 (process OP1). 5×5 pixels will be acquired sequentially.

The CPU 51 sequentially performs averaging of the acquired 5×5 pixels (process OP2), and writes a result in a memory 82. It is assumed that memory 82 is a storage area that stores averaged image data.

Further, even in a case where it is a pixel of 5×5 pixels acquired in the process OP1 and is a pixel of the invalid area, the CPU 51 performs a process of indicating it as zero (process OP3) and writes the data in the memory 82.

For example, as illustrated in a left drawing of FIG. 11B, the image data may include a field FD serving as the farm field 210, a road RD (a road around a field, a footpath, or the like), and others AN. In this case, the field FD is a valid area, and the road RD and the other AN are invalid areas. Thus, the invalid area is not an accuracy securing target.

Further, even within the field FD, an area at the edge of the image (an area at the corner of the captured image) is unable to undergo averaging of 5×5 pixels. For example, in the case of a pixel EG at the edge, shaded pixels are necessary for averaging of 5×5 pixels, and in this case, necessary averaging is unable to be performed because there is no pixel data. Therefore, the accuracy is not sufficient for the pixel EG.

Therefore, as illustrated in a right drawing, an area NFD of the pixel in the edge part is treated similarly to the invalid area.

With the above process, the process of steps S250, S251, and S252 of FIG. 10 is performed, and the SNR improvement process which is step S241 is performed.

Thereafter, the stitching process of the image data of each frame is performed (S242), and, for example, an image of the entire farm field is formed. Then, the vegetation index is calculated (S243), and a vegetation index image is presented to the user as a UI process (S244).

By using the image data which has undergone the SNR improvement, the accuracy of the vegetation index which is calculated and presented is improved.

Further, when the image of the vegetation index is displayed by display unit 56 or the like, the invalid area and the area with insufficient accuracy are explicitly indicated, and thus the user can correctly recognize a part with high accuracy in the image.

Figure 12A:
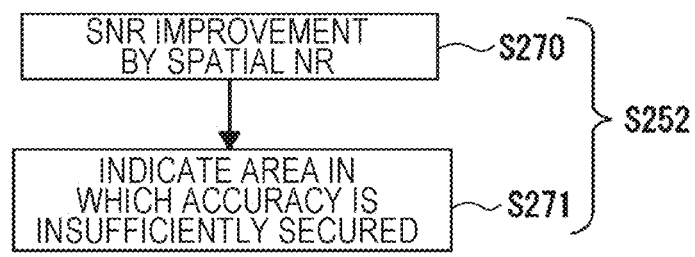
FIGS. 12A and 12B are explanatory diagrams of SNR improvement of each pixel according to an embodiment.
Figure 12B:
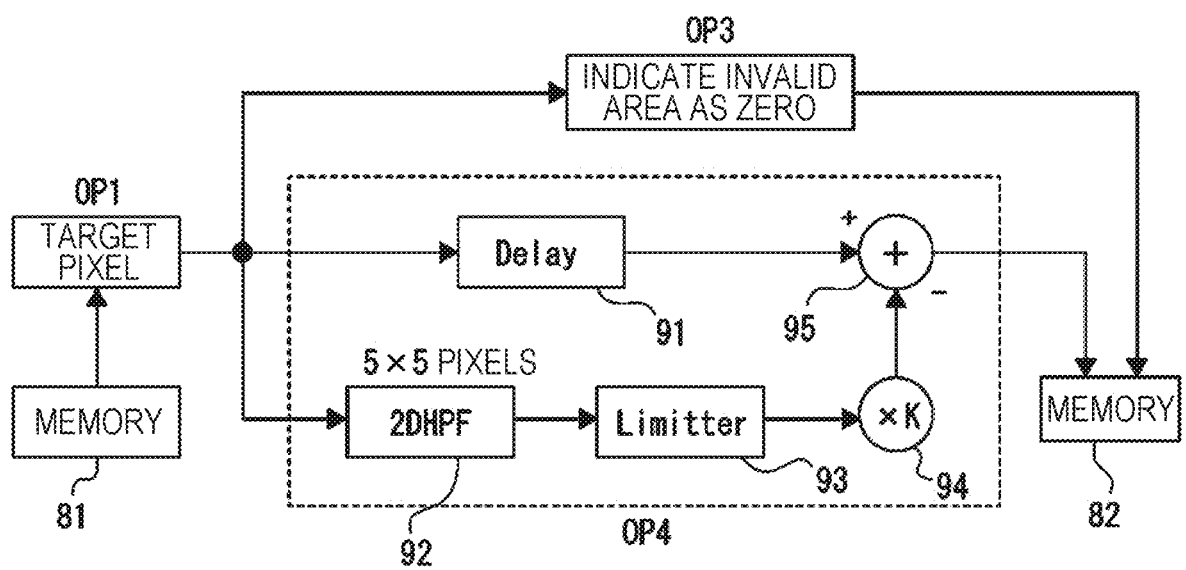

Further, the SNR improvement of each pixel may be performed by a process illustrated in FIGS. 12A and 12B in place of the process illustrated in FIGS. 11A to 11C.

As illustrated in FIG. 12A, the CPU 51 performs the SNR improvement by spatial noise reduction in step S270, and performs the process of indicating the area for which the accuracy is insufficiently secured in step 3271. FIG. 12B illustrates this process using a block diagram.

A target pixel is acquired from the memory 81. In other words, 5×5 pixels are sequentially acquired (process OP1).

The spatial noise reduction is performed on the acquired 5×5 pixels (process OP4). First, a high-frequency component is extracted by a two-dimensional high-pass filter (2DHPF) 92 for 5×5 pixel data. Then, a large edge part is limited by a limiter 93, multiplied by a coefficient k by a multiplier 94, and supplied to a subtractor 95. An original pixel signal is supplied to the subtractor 95 via a delay circuit 91 for timing adjustment. Therefore, the subtractor 95 subtracts the output of the multiplier 94 from the original signal. Accordingly, the SNR improvement is performed. The output of the subtractor 95 is written in the memory 82. Further, the process of each part of the process OP4 is illustrated as being performed by a hardware calculation but may be performed by a software calculation.

As described above, the SNR improvement can be performed by the spatial noise reduction, but in this case, desired SNR improvement can be performed by increasing the coefficient k in accordance with the necessary SNR amount. Further, the pixel of the invalid area is indicated as zero (process OP3) and written in the memory 82, similarly to the example of FIGS. 11A to 11C.

4. Second Embodiment

As a second embodiment, an example in which the imaging device 250 is not a hyper spectral camera but a multispectral camera capable of calculating an arbitrary wavelength in a tunable manner will be described.

A difference between the case of the hyper spectral camera and the case of the multispectral camera lies in that the SNR calculated by Formula 1 is calculated as follows in the case of the multispectral camera. First, Formula 8 to Formula 12 will be described.

[Math. 8]

$$CameraOut(\lambda) = L(\lambda) \times P(\lambda) \times C(\lambda) \quad \text{(Formula 8)}$$

$$L(\lambda) \times P(\lambda) = CameraOut(\lambda) \times C^{-1}(\lambda) \quad \text{(Formula 9)}$$

$$= \begin{pmatrix} A \\ B \\ C \\ D \end{pmatrix} \begin{pmatrix} E & I & M & Q \\ F & J & N & R \\ G & K & O & S \\ H & L & P & T \end{pmatrix}_{(\lambda=i)} \quad \text{(Formula 10)}$$

$$Si = (Aave \times E) + (Aave \times I) + \ldots + (Dave \times P) + (Dave \times T) \quad \text{(Formula 11)}$$

$$Ni = \left((Ni \times E^2) + (Ni \times I)^2 + \ldots + (Ni \times P)^2 + (Ni \times T)^2\right)^{0.5} \quad \text{(Formula 12)}$$

An output CameraOut(λ) of the imaging device 250 (the multispectral camera) can be indicated as in Formula 8. A spectral characteristic to be multiplied is schematically illustrated in FIG. 13B. Further, FIGS. 13A and 13C are similar to FIGS. 8A and 8C.

Since the spectral characteristic L(λ) of the sunlight is corrected on the basis of light source information later, L(λ)×P(λ) is calculated by including this. If a necessary wavelength λ is indicated by λ=i and λ=j, it is desirable to perform a calculation for the wavelengths i and j. Here, a case where λ=i will be described.

L(λ)×P(λ) can be indicated as in Formula 9.

Here, it is assumed that the multispectral camera includes four types of filters, outputs of the filters are "A," "B," "C," and "D," and C−1(λ) when λ=i is a matrix of "E" to "T" illustrated in Formula 10.

A signal Si (a signal when the wavelength(λ)=i) for each of the outputs "A," "B," "C," and "D" is calculated by Formula 11 using Aave, Bave, Cave, and Dave as values calculated by "(1) a calculation of average value of pixels in a frame" described in the first embodiment when a signal is acquired.

On the other hand, the noise level is calculated as in Formula 12 if a noise decided from the light shot noise Ns, the dark-time noise Nd, and the quantization noise Nq is indicated by Ni.

From this, the SNR is calculated for each wavelength (here, λ=i and j). The other processes will be performed, similarly to the first embodiment.

5. Third Embodiment

A case where "a camera for detecting a specific wavelength band assuming a specific purpose" is used as the imaging device 250 is illustrated in FIGS. 14A to 14C.

FIGS. 14A and 14C are similar to FIGS. 8A and 8C.

FIG. 14A schematically illustrates the case of a specific wavelength band detecting camera as the spectral characteristic C(λ) of the imaging device 250.

For example, in a case where an image at the time of acquisition is RED (red wavelength band) and NIR (near infrared wavelength band), it is desirable to obtain the spectral characteristic P(λ) of the reflectance ratio of the subject using the wavelength ratio i=RED and the wavelength ratio j=NIR, similarly to the first embodiment.

6. Fourth Embodiment

In the first embodiment, in the "vegetation index SNR prediction" of step S250 in FIG. 10, the smaller SNR is defined as the SNR of the frame, and an improvement amount is estimated on the basis of the worse SNR including the variation of the signal component as well (see Formula 1, Formula 2, and Formula 3), but the present disclosure is not limited thereto. A different example will be described as a fourth embodiment.

In a case where the resolution of the image is important, it is desirable to constantly define the result obtained in Formula 1 as the SNR of the frame.

In this case, it is possible to constantly perform improvement based on an SNR for a noise signal regardless of a variation (a pattern and a resolution) of a signal.

Further, as a method which is slightly modified, a valid area which is a target of each frame is divided into a plurality of blocks, and SNR1 and SNR2 are calculated for each block using Formula 1 and Formula 2. At this time, a signal level S is an average signal level of each block.

Then, SNR1 and SNR2 are compared for each block.

In a block in which the difference between SNR1 and SNR2 is large, it can be determined that it is not suitable for SNR prediction because it is a block where the variation of the signal is large and the resolution is large.

Conversely, in a case where the difference between SNR1 and SNR2 is small, it can be determined that it is suitable for SNR prediction because it is a block where the variation of the signal is small and the resolution is small.

In this regard, only blocks suitable for the SNR prediction are collected from each of a plurality of blocks obtained by dividing the frame, and an average value of those blocks is predicted as the SNR of the frame.

Alternatively, instead of the average value, a maximum value or a minimum value may be predicted as the SNR of the frame.

As described above, various types of technique can be considered for the SNR prediction.

7. Application Example to Mobile Body

The technology of the SNR improvement (the present technology) according to the present disclosure can be applied to various products. For example, the technology according to the present disclosure may be implemented as devices mounted on any type of mobile bodies such as automobiles, electric vehicles, hybrid electric vehicles, motorcycles, bicycles, personal mobilities, airplanes, drones, ships, and robots.

Figure 15:
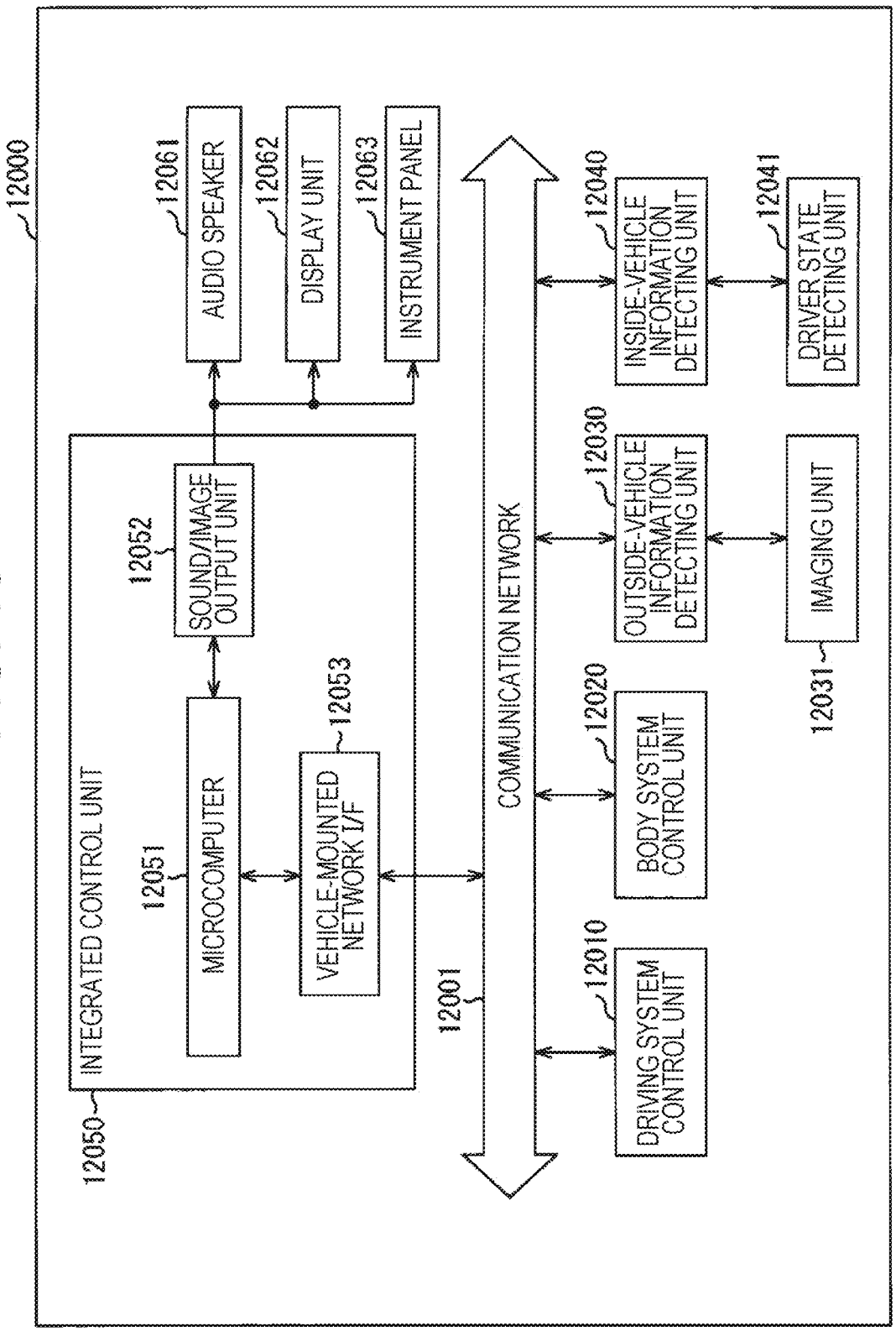
FIG. 15 is a block diagram illustrating an example of a schematic configuration of a vehicle control system.

FIG. 15 is a block diagram illustrating a schematic configuration example of a vehicle control system which is an example of a mobile body control system to which the technology according to the present disclosure can be applied.

A vehicle control system 12000 includes a plurality of electronic control units connected via a communication network 12001. In the example illustrated in FIG. 15, the vehicle control system 12000 includes a driving system control unit 12010, a body system control unit 12020, an outside-vehicle information detecting unit 12030, an in-vehicle information detecting unit 12040, and an integrated control unit 12050. Further, as a functional configuration of the integrated control unit 12050, a microcomputer 12051, an audio/video output unit 12052, and an in-vehicle network interface (I/F) 12053 are illustrated.

The driving system control unit 12010 controls the operation of devices related to the drive system of the vehicle in accordance with various types of programs. For example, the driving system control unit 12010 functions as a control device for a driving force generating device for generating the driving force of the vehicle, such as an internal combustion engine, or a driving motor, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to the vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, or a fog lamp. In this case, radio waves transmitted from a mobile device as an alternative to a key or signals of various kinds of switches can be input to the body system control unit12020. The body system control unit 12020 receives these input radio waves or signals, and controls a door lock device, the power window device, the lamps, or the like of the vehicle.

The outside-vehicle information detecting unit 12030 detects information outside the vehicle including the vehicle control system 12000. For example, an imaging unit 12031 is connected to the outside-vehicle information detecting unit 12030. The outside-vehicle information detecting unit 12030 causes the imaging unit 12031 to capture an image outside the vehicle and receives the captured image. The outside-vehicle information detecting unit 12030 may perform an object detection process or a distance detection process of a person, a vehicle, an obstacle, a sign, a character on a road surface, or the like on the basis of the received image.

The imaging unit 12031 is an optical sensor that receives light and outputs an electrical signal in accordance with an amount of received light. The imaging unit 12031 can output an electrical signal as an image or can output it as ranging information. Further, the light received by the imaging unit 12031 may be visible light or invisible light such as infrared light.

The in-vehicle information detecting unit 12040 detects vehicle inside information. For example, a driver state detecting unit 12041 that detects a state of a driver is connected to the in-vehicle information detecting unit 12040. The driver state detecting unit 12041 includes, for example, a camera for imaging the driver, and the in-vehicle information detecting unit 12040 may calculate a degree of fatigue of the driver or a degree of concentration of the driver or may determine whether or not the driver is dozing on the basis of detection information input from the driver state detecting unit 12041.

The microcomputer 12051 may calculate a control target value for the driving force generating device, the steering mechanism, or the braking device on the basis of the obtained information about the inside and outside of the vehicle obtained by the outside-vehicle information detecting unit 12030 or the in-vehicle information detecting unit 12040, and output a control command to the driving system control unit 12010. For example, the microcomputer 12051 may perform cooperative control intended to implement functions of an advanced driver assistance system (ADAS) including collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 may perform cooperative control intended for automatic driving, which makes the vehicle to travel autonomously without depending on the operation of the driver, or the like, by controlling the driving force generating device, the steering mechanism, the braking device, or the like on the basis of the information about the surroundings of the vehicle acquired by the outside-vehicle information detecting unit 12030 and the in-vehicle information detecting unit 12040.

Further, the microcomputer 12051 may output a control command to the body system control unit 12020 on the basis of the information about the outside of the vehicle acquired by the outside-vehicle information detecting unit 12030. For example, the microcomputer 12051 may control a headlamp in accordance with a position of a preceding vehicle or an oncoming vehicle detected by the outside-vehicle information detecting unit 12030 and performs cooperative control for the purpose of achieving antiglare such as switching a high beam to a low beam.

The audio/video output unit 12052 transmits an output signal of at least one of a sound or an image to an output device capable of visually or auditorily notifying information to an occupant of the vehicle or the outside of the vehicle. In the example of FIG. 1021, an audio speaker 12061, a display unit 12062 and an instrument panel 12063 are illustrated as output devices. The display unit 12062 may include, for example, at least one of an on-board display or a head-up display.

Figure 16:
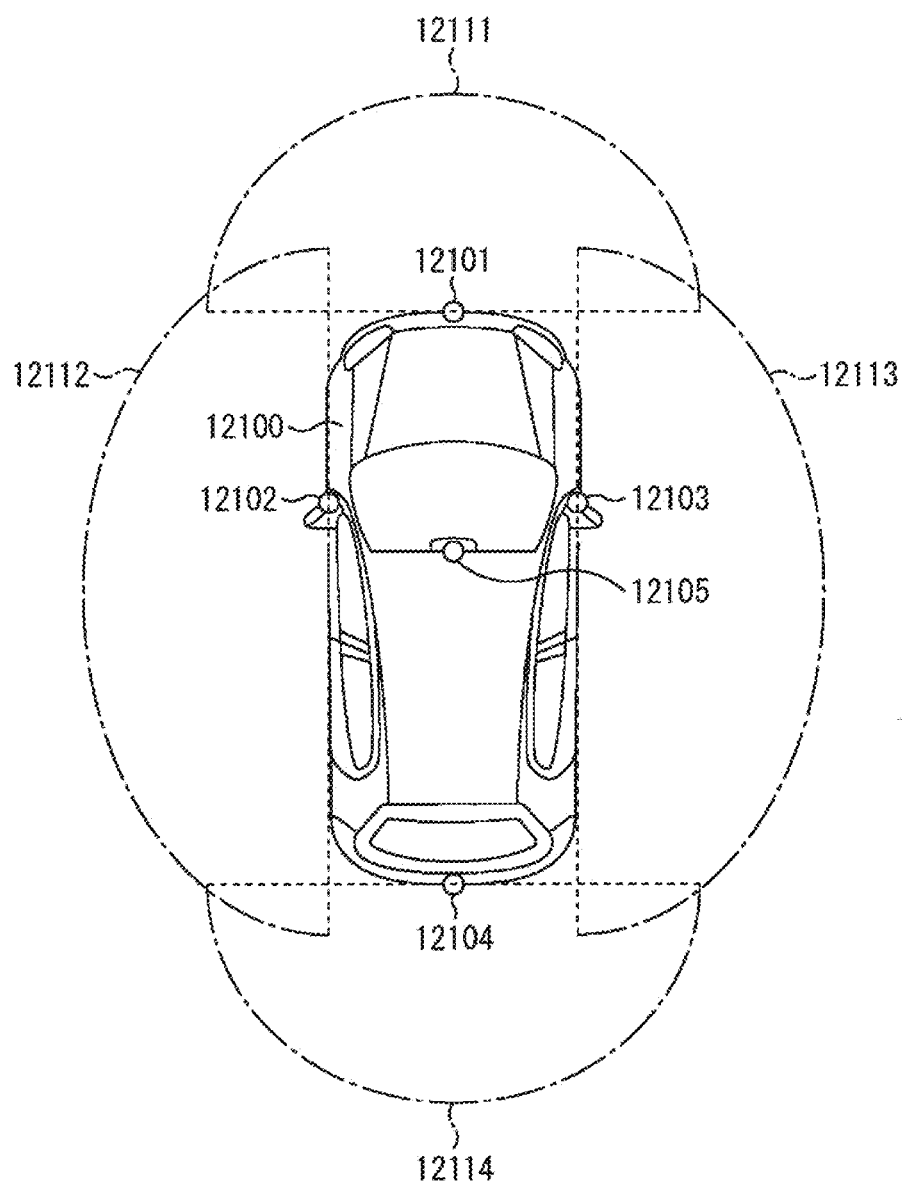
FIG. 16 is an explanatory diagram illustrating an example of an installation position of an outside-vehicle information detecting unit and an imaging unit.

FIG. 16 is a diagram illustrating an example of an installation position of the imaging unit 12031.

In FIG. 16, imaging units 12101, 12102, 12103, 12104, and 12105 are installed as the imaging unit 12031.

The imaging units 12101, 12102, 12103, 12104, and 12105 are installed, for example, on a front nose, a side mirror, a rear bumper, a back door, an upper part of a windshield in a vehicle cabin, and the like of a vehicle 12100. The imaging unit 12101 installed on the front nose and the imaging unit 12105 installed on the upper part of the windshield of the vehicle cabin mainly acquire an image in front of the vehicle 12100. The imaging units 12102 and 12103 installed in the side mirror mainly acquire an image of the side of the vehicle 12100. The imaging unit 12104 installed in the rear bumper or the back door mainly acquires an image behind the vehicle 12100. The imaging unit 12105 installed on the upper part of the windshield in the vehicle cabin is used to mainly detect a preceding vehicle, a pedestrian, an obstacle, a traffic light, a traffic sign, a lane, or the like.

Further, FIG. 16 illustrates an example of imaging ranges of the imaging units 12101 to 12104. An imaging range 12111 indicates an imaging range of the imaging unit 12101 installed on the front nose, imaging ranges 12112 and 12113 indicate imaging ranges of the imaging units 12102 and 12103 installed on the side mirror, respectively, and an imaging range 12114 indicates an imaging range of the imaging unit 12104 installed in the rear bumper or the back door. For example, an overhead view image of the vehicle 12100 when viewed from above can be obtained by causing image data captured by the imaging units 12101 to 12104 to overlap.

At least one of the imaging units 12101 to 12104 may have a function of acquiring distance information. For example, at least one of the imaging units 12101 to 12104 may be a stereo camera including a plurality of imaging elements or may be an imaging element including pixels for phase difference detection.

For example, the microcomputer 12051 obtains a distance to each of three-dimensional objects in the imaging range 12111 to 12114 and a temporal change in the distance (a relative velocity to the vehicle 12100) on the basis of distance information obtained from the imaging units 12101 to 12104 and thus can extract a three-dimensional object which is closest on a traveling path of the vehicle 12100 and travels at a predetermined speed (for example, 0 km/h or more) in substantially the same direction as the vehicle 12100 as a preceding vehicle. Further, the microcomputer 12051 can set an inter-vehicle distance to be secured in front of the preceding vehicle in advance and perform automatic brake control (including follow-up stop control), automatic acceleration control (including follow-up start control), or the like. As described above, coordinated control can be performed for the purpose of autonomous driving of traveling autonomously without depending on the operation of the driver, for example.

For example, on the basis of the distance information obtained from the imaging units 12101 to 12104, the microcomputer 12051 can classify three-dimensional object data related to three-dimensional objects into two-wheeled vehicles, ordinary vehicles, large vehicles, pedestrians, telephone poles, and other three-dimensional objects, extract them, and use them for automatic obstacle avoidance. For example, the microcomputer 12051 identifies obstacles nearby the vehicle 12100 as obstacles which is visible to the driver of the vehicle 12100 and obstacles which are invisible to the driver. Then, the microcomputer 12051 determines a collision risk indicating a degree of risk of collision with each obstacle, and when the collision risk is higher than a set value, and there is a possibility of collision, driving assistance for collision avoidance can be performed by outputting an alarm to the driver through an audio speaker 12061 or a display unit 12062 or performing forced deceleration or avoidance steering via the driving system control unit 12010.

At least one of the imaging units 12101 to 12104 may be an infrared camera that detects infrared light. For example, the microcomputer 12051 can recognize a pedestrian by determining whether or not there is a pedestrian in the captured images of the imaging units 12101 to 12104. The pedestrian recognition is performed by, for example, a procedure for extracting feature points in the captured images of the imaging units 12101 to 12104 which are infrared cameras and a procedure of determining whether or not there is a pedestrian by performing a pattern matching process on a series of feature points indicating a contour of an object. If the microcomputer 12051 determines that there is a pedestrian in the captured images of the imaging unit 12101 to 12104 and recognizes the pedestrian, the audio/video output unit 12052 controls the display unit 12062 such that a square contour line for emphasizing the recognized pedestrian is displayed in a superimposed manner. Further, the audio/video output unit 12052 may control the display unit 12062 such that an icon or the like indicating a pedestrian is displayed at a desired position.

The example of the vehicle control system to which the technology according to the present disclosure can be applied has been described above. The technology according to the present disclosure can be used to improve the SNR for image data captured by the imaging units 12101 to 12104 in the configuration described above. Accordingly, it is possible to perform sensing with high accuracy or the like.

8. Conclusion and Modified Example

In the above embodiment, the following effects can be obtained.

The information processing device 1 of the embodiment includes the evaluation calculating unit 74 that performs a process of predicting an SNR of image data, an SNR improvement process of adjusting the SNR of the image data on the basis of the predicted SNR, and a process of calculating an evaluation index in a state in which the SNR improvement process is reflected.

In a case where the image sensor is used for sensing, an SNR in units of pixels is strict, and desired accuracy is unlikely to be achieved. For example, in a case where an evaluation index is obtained from image data obtained by imaging an observation target, the SNR of the image data may not be sufficient in accuracy.

Therefore, an SNR is predicted for each image, and the SNR adjustment (SNR improvement) corresponding to the SNR is performed. Accordingly, it is possible to constantly maintain a certain degree of accuracy or more for the evaluation index obtained from image data captured in an environment in which the SNR is likely to vary.

For example, in a case where a quality of a soil component, a vegetation index, or the like is measured by remote sensing, it is possible to generate a certain number or more of evaluation index images regardless of the weather or an environment, and it is possible to detect a growing state of a crop and provide appropriate information for soil inspection or the like.

Further, in addition to the vegetation, for example, in a case where an image for checking a situation around a vehicle, a safety evaluation image, or the like is generated with an in-vehicle camera, it is possible to prevent the accuracy from being lowered due to a decrease in SNR.

In an embodiment, the SNR of the image data of the evaluation index is predicted, and the evaluation index is calculated in a state in which the SNR improvement process of each element in which the evaluation index is calculated and each pixel of the image data is performed. (see FIG. 10).

For example, an SNR of image data of an evaluation index such as an NDSI image is predicted, and SNR improvement of an element in which the evaluation index is calculated (for example, an image of a specific wavelength) or each pixel thereof is performed.

Accordingly, the appropriate SNR adjustment can be performed on the image data of the evaluation index, and the accuracy of the evaluation index can be improved.

In an embodiment, the SNR improvement process may be a process of adjusting the SNR of the image data in accordance with a deficient SNR obtained from the predicted SNR and from a target SNR (see FIG. 10 and Formulas 1 to 7).

Since insufficiency for the target SNR is estimated by predicting the SNR, the SNR adjustment corresponding to the deficient SNR is performed. Accordingly, the SNR adjustment of an appropriate improvement amount can be performed.

In an embodiment, in the SNR improvement process, the example in which averaging neighboring pixels corresponding to a number obtained using the deficient SNR is performed in order to improve the SNR of each pixel of the image data has been described (see FIGS. 11A to 11C). When averaging of neighboring pixels is performed for the SNR adjustment corresponding to the deficient SNR, the number of neighboring pixels to be averaged is set to a number obtained using the deficient SNR. Accordingly, an appropriate SNR adjustment can be performed on the target SNR.

In an embodiment, in the SNR improvement process, the example in which the spatial noise reduction is performed on neighboring pixels corresponding to a number obtained using the deficient SNR in order to improve the SNR of each pixel of the image data has been described (see FIGS. 12A and 12B).

Even in a case where the spatial noise reduction is performed as the SNR improvement technique, the number of target pixels is set to a number obtained using the deficient SNR. Accordingly, an appropriate SNR adjustment can be performed on the target SNR.

In an embodiment, the example in which the process explicitly indicating an area in which the SNR improvement process is not valid is performed when the evaluation index is presented has been described (see FIG. 11C).

In other words, an area in which sufficient accuracy is unable to ensured even with SNR improvement is presented to the users clearly. Accordingly, the user can confirm the presented evaluation index by clearly distinguishing the area for which the accuracy has been secured by the SNR improvement and the area for which the accuracy has not been secured by the SNR improvement.

In an embodiment, the example in which the evaluation index is the vegetation evaluation index (for example, the NDSI) has been described.

In other words, in a system that performs remote sensing of vegetation, SNR improvement is performed on a captured image or a vegetation evaluation image generated from a captured image.

Accordingly, it is possible to improve the evaluation accuracy in sensing the plant.

Particularly, in a case where the outdoor farm field 210 is a target, the sensing result greatly differs due to various factors such as a sun position according to a time zone, a photographing angle, and the weather. Even in one flight, it suddenly changes from sunny to cloudy, and the sensing result is affected. Further, there is also a problem about the accuracy of the image sensor.

In the present embodiment, by improving the SNR of the image, it is possible to reduce or eliminate the influence of a variation in such external factors or system conditions, and it is possible to constantly obtain excellent sensing results.

Further, for example, in a case where a crop growing state of this year is desired to be correctly compared with a crop growing state of last year, unconditional comparison is unable to be performed due to a difference in accuracy, but when the SNR improvement (SNR adjustment) is performed as in the present embodiment, the evaluation accuracy becomes stable, and unconditional comparison can be performed. In other words, it is also preferable in terms of comparative evaluation at different time points.

In an embodiment, the example in which the spectral characteristic $P(\lambda)$ of the reflectance ratio of the plant is calculated by reflecting the spectral characteristic L(λ) of the light source (sunlight), and the vegetation index is calculated from the calculated spectral characteristic P(λ) of the reflectance ratio of the plant has been described.

By calculating the spectral characteristics of the reflectance ratio of the plant in a state in which the sunlight which is a light source that fluctuates due to the influence of the weather or the like is calibrated, the reflectance ratio of the plant can be calculated regardless of the state of the sunlight, and the accuracy of the vegetation index can be improved.

In an embodiment, the example in which the process of obtaining a predictive value of the SNR of the image data using values of an average signal level, a light shot noise, a dark-time noise, and a quantization noise of a frame for each frame of the image data is performed has been described (see FIG. 10 and Formulas 1 to 5).

The average signal level of the frame is an average value of pixels in the frame. The light shot noise, the dark-time noise, and the quantization noise are calculated from the specifications of the image sensor of the imaging device. The predictive value of the SNR of the image data is obtained by a calculation using them.

In this case, the predictive SNR can be obtained relatively easily by obtaining the average signal level of the frame for each frame.

A program according to an embodiment is a program causing an information processing device to execute a process of predicting an SNR of image data, an SNR improvement process of adjusting the SNR of the image data on the basis of the predicted SNR, and a process of calculating an evaluation index on the basis of the image data which has undergone the SNR adjustment process.

In other words, it is a program causing the information processing device 1 to execute the processing of FIG. 10.

With such a program, it is easy to implement the information processing device 1 of the present embodiment.

Further, such a program can be stored in advance in a recording medium installed in a device such as a computer device, a ROM in a microcomputer having a CPU, or the like. Alternatively, the program may be stored temporarily or permanently in a removable recording medium such as a semiconductor memory, a memory card, an optical disk, an optical magnetic disk, or a magnetic disk. Further, such a removable recording medium may be provided as so-called package software.

Further, although such a program is installed from a removable storage medium into a personal computer or the like, the program may be downloaded from a download site via a network such as a LAN or the Internet.

Further, in an embodiment, the example in which the SNR improvement process is performed has been described, but stabilizing the SNR at a certain rate is also effective in a case where it is desired to stabilize the sensing accuracy.

In this regard, although there are cases in which the SNR is improved necessarily, there are cases in which the SNR is partially lowered in order to stabilize it to a target SNR value depending on circumstances.

Therefore, in the present disclosure, the SNR adjustment refers to the SNR stabilization as well as the SNR improvement.

Further, the effects described in this specification are merely examples and are not limited, and other effects may be included.

Further, the present technology can have the following configurations.

(1)

An information processing device, including:
an evaluation calculating unit that performs a process of predicting an SNR of image data,
an SNR adjustment process of adjusting the SNR of the image data on the basis of the predicted SNR, and
a process of calculating an evaluation index on the basis of the image data which has undergone the SNR adjustment process.

(2)

The information processing device according to (1), in which the evaluation calculating unit
predicts an SNR of image data of an evaluation index, and calculates the evaluation index in a state in which the SNR adjustment process of each element in which the evaluation index is calculated and each pixel of the image data is performed.

(3)

The information processing device according to (1) or (2), in which the SNR adjustment process is a process of adjusting the SNR of the image data in accordance with a deficient SNR obtained from the predicted SNR and from a target SNR.

(4)

The information processing device according to (3), in which the SNR adjustment process is a process of averaging neighboring pixels corresponding to a number obtained using the deficient SNR.

(5)

The information processing device according to (3), in which the SNR adjustment process is a process of performing spatial noise reduction on neighboring pixels corresponding to a number obtained using the deficient SNR.

(6)

The information processing device according to any one of (1) to (5), in which a process explicitly indicating an area in which the SNR adjustment process is not valid is performed when the evaluation index is presented.

(7)

The information processing device according to any one of (1) to (6), in which the evaluation index is a vegetation evaluation index.

(8)

The information processing device according to (7), in which the evaluation calculating unit calculates a spectral characteristic of a reflectance ratio of a plant by reflecting a spectral characteristic of a light source and calculates the vegetation index from the calculated spectral characteristic of the reflectance ratio of the plant.

(9)

The information processing device according to any one of (1) to (8), in which the evaluation calculating unit performs a process of obtaining a predictive value of the SNR of the image data using values of an average signal level, a light shot noise, a dark-time noise, and a quantization noise of a frame for each frame of the image data.

(10)

An information processing method executed by an information processing device, including:
a process of predicting an SNR of image data;
an SNR adjustment process of adjusting the SNR of the image data on the basis of the predicted SNR; and
a process of calculating an evaluation index on the basis of the image data which has undergone the SNR adjustment process.

(11)
A program causing an information processing device to execute:
  a process of predicting an SNR of image data;
  an SNR adjustment process of adjusting the SNR of the image data on the basis of the predicted SNR; and
  a process of calculating an evaluation index on the basis of the image data which has undergone the SNR adjustment process.

(1')
An information processing device, comprising:
  acquisition circuitry configured to acquire image data including a frame; and index calculation circuitry configured to:
  determine an average value of the frame, and predict a signal-to-noise ratio of the image data based on the average value of the frame.

(2')
The information processing device according to (1'), wherein
  the frame includes a plurality of pixels, and
  the index calculation circuitry is further configured to detect at least one of an edge part of the frame, an invalid area of the frame, or a variation of the plurality of pixels.

(3')
The information processing device according to (2'), wherein the index calculation circuitry is configured to predict the signal-to-noise ratio of the image data based on the average value of the frame and at least one of the edge part of the frame, the invalid area of the frame, or the variation of the plurality of pixels.

(4')
The information processing device according to any one of (1') to (3'), wherein the index calculation circuitry is further configured to adjust the signal-to-noise ratio of the image data based on the predicted signal-to-noise ratio, and to calculate an evaluation index based on the adjusted signal-to-noise ratio.

(5')
The information processing device according to (4'), wherein the index calculation circuitry is configured to adjust the signal-to-noise ratio of the image data by performing a spatial noise reduction.

(6')
The information processing device according to (4') or (5'), wherein
  the frame includes a plurality of pixels, and
  the index calculation circuitry is configured to adjust the signal-to-noise ratio of a respective pixel of the plurality of pixels by determining an average of surrounding pixels of the plurality of pixels.

(7')
The information processing device according to any one of (4') to (6'), further comprising:
  determination circuitry configured to calculate a vegetation index based on the evaluation index.

(8')
The information processing according to (7'), wherein the vegetation index is a normalized difference vegetation index.

(9')
The information processing device according to any one of (1') to (8'), wherein the acquisition circuitry includes an image sensor.

(10')
The information processing device according to (9'), wherein the image sensor is configured to capture electromagnetic radiation having a wavelength from 450 nm to 750 nm.

(11')
The information processing device according to (9') or (10'), wherein the image sensor is configured to capture electromagnetic radiation having a wavelength from 620 nm to 2500 nm.

(12')
The information processing device according to any one of (1') to (11'), wherein the acquisition circuitry includes a hyper spectral camera.

(13')
The information processing device according to any one of (1') to (12'), wherein the acquisition circuitry includes a multispectral camera.

(14')
The information processing device according to any one of (1') to (13'), wherein the acquisition circuitry includes at least one sensor configured to acquire at least one of an imaging date/time information, a position information, illuminance information, altitude information, or imaging posture information.

(15')
The information processing device according to any one of (1') to (14'), wherein the image data includes a plurality of frames including the frame, and the index calculation circuitry is configured to perform a stitching process on the image data.

(16')
The information processing device according to any one of (1') to (15'), wherein the index calculation circuitry is configured to predict the signal-to-noise ratio of the image data based on information corresponding to an entirety of an image in the frame.

(17')
A drone comprising the information processing device according to any one of (1') to (16').

(18')
An automobile comprising the information processing device according to any one of (1') to (17').

(19')
An information processing method, comprising:
  acquiring image data including a frame;
  determining an average value of the frame; and
  predicting a signal-to-noise ratio of the image data based on the average value of the frame.

(20')
A non-transitory computer-readable medium storing instructions that, when executed by a processor of a computer, cause the computer to perform operations comprising:
  acquiring image data including a frame;
  determining an average value of the frame; and
  predicting a signal-to-noise ratio of the image data based on the average value of the frame.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Information processing device
31 Imaging unit
32 Imaging signal processing unit 33 Camera control unit
34 Storage unit
35 Communication unit
41 Position detecting unit
42 Timepiece unit
43 Posture detecting unit
44 Altitude detecting unit
51 CPU
52 ROM
53 RAM
54 Bus
55 Input/output interface
56 Display unit
57 Input unit
58 Audio output unit
59 Storage unit
60 Communication unit
61 Medium drive
62 Memory card
71 Data transfer control unit
72 Illuminance data processing unit
73 Camera data processing unit
74 Evaluation calculating unit
75 Display control unit
200 Flight vehicle
210 Farm field
250 Imaging device
251 Sensor unit
260 Sensor box
261 Illuminance sensor
262 Sensor control unit

The invention claimed is:

1. An information processing device, comprising:
acquisition circuitry configured to acquire image data including a frame, the frame including a plurality of pixels; and
index calculation circuitry configured to:
determine an average value of the plurality of pixels of the frame,
detect an edge part of the frame and an invalid area of the frame, and
predict a signal-to-noise ratio of the image data based on the average value of the plurality of pixels of the frame excluding the edge part of the frame and the invalid area of the frame.

2. The information processing device according to claim 1, wherein
the index calculation circuitry is further configured to adjust the signal-to-noise ratio of the image data based on the predicted signal-to-noise ratio, and to calculate an evaluation index based on the adjusted signal-to-noise ratio.

3. The information processing device according to claim 2, wherein
the index calculation circuitry is configured to adjust the signal-to-noise ratio of the image data by performing a spatial noise reduction.

4. The information processing device according to claim 2, wherein
the frame includes a plurality of pixels, and
the index calculation circuitry is configured to adjust the signal-to-noise ratio of a respective pixel of the plurality of pixels by determining an average of surrounding pixels of the plurality of pixels.

5. The information processing device according to claim 2, further comprising:
determination circuitry configured to calculate a vegetation index based on the evaluation index.

6. The information processing device according to claim 5, wherein
the vegetation index is a normalized difference vegetation index.

7. The information processing device according to claim 1, wherein
the acquisition circuitry includes an image sensor.

8. The information processing device according to claim 7, wherein
the image sensor is configured to capture electromagnetic radiation having a wavelength from 450 nm to 750 nm.

9. The information processing device according to claim 7, wherein
the image sensor is configured to capture electromagnetic radiation having a wavelength from 620 nm to 2500 nm.

10. The information processing device according to claim 1, wherein
the acquisition circuitry includes a hyper spectral camera.

11. The information processing device according to claim 1, wherein
the acquisition circuitry includes a multispectral camera.

12. The information processing device according to claim 1, wherein
the acquisition circuitry includes at least one sensor configured to acquire at least one of an imaging date/time information, a position information, illuminance information, altitude information, or imaging posture information.

13. The information processing device according to claim 1, wherein
the image data includes a plurality of frames including the frame, and the index calculation circuitry is configured to perform a stitching process on the image data.

14. The information processing device according to claim 1, wherein
the index calculation circuitry is configured to predict the signal-to-noise ratio of the image data based on information corresponding to an entirety of an image in the frame.

15. A drone comprising the information processing device according to claim 1.

16. An automobile comprising the information processing device according to claim 1.

17. An information processing method, comprising:
acquiring image data including a frame, the frame including a plurality of pixels;
determining an average value of the plurality of pixels of the frame;
detecting an edge part of the frame and an invalid area of the frame; and
predicting a signal-to-noise ratio of the image data based on the average value of the plurality of pixels of the frame excluding the edge part of the frame and the invalid area of the frame.

18. A non-transitory computer-readable medium storing instructions that, when executed by a processor of a computer, cause the computer to perform operations comprising:
acquiring image data including a frame, the frame including a plurality of pixels;
determining an average value of the plurality of pixels of the frame;

detecting an edge part of the frame and an invalid area of the frame; and predicting a signal-to-noise ratio of the image data based on the average value of the plurality of pixels of the frame excluding the edge part of the frame and the invalid area of the frame.

\* \* \* \* \*